United States Patent [19]
Vassiliadis et al.

[11] Patent Number: 5,299,319
[45] Date of Patent: Mar. 29, 1994

[54] HIGH PERFORMANCE INTERLOCK COLLAPSING SCISM ALU APPARATUS

[75] Inventors: Stamatis Vassiliadis, Austin; James E. Phillips, Round Rock, both of Tex.

[73] Assignee: International Business Machines Corporation, N.Y.

[21] Appl. No.: 677,079

[22] Filed: Mar. 29, 1991

Related U.S. Application Data

[63] Continuation-in-part of Ser. No. 504,910, Apr. 4, 1990, Pat. No. 5,051,940, and Ser. No. 619,868, Nov. 28, 1990, Pat. No. 5,301,341.

[51] Int. Cl.$^5$ .......................... G06F 15/20; G06F 9/40
[52] U.S. Cl. ..................... 395/375; 364/258; 364/259; 364/263; 364/944.4; 364/948.3; 364/DIG. 2; 364/736; 364/787; 395/775; 395/800
[58] Field of Search ................ 364/736, 787; 395/375, 395/800, 775

[56] References Cited

U.S. PATENT DOCUMENTS

| | | | |
|---|---|---|---|
| 4,084,254 | 4/1978 | Birney et al. | 364/766 |
| 4,439,828 | 3/1984 | Martin . | |
| 4,754,412 | 6/1988 | Deering | 364/736 |
| 4,766,416 | 8/1988 | Noujaim | 340/347 |
| 4,775,952 | 10/1988 | Danielsson et al. | 364/736 |
| 4,819,155 | 4/1989 | Wulf et al. . | |
| 4,852,040 | 7/1989 | Oota | 364/768 |
| 4,942,548 | 7/1990 | Vassiliadis | 364/784 |
| 4,979,141 | 12/1990 | Gelinas et al. | 364/787 |
| 5,051,940 | 9/1991 | Vassiliadis et al. | 364/736 |
| 5,140,545 | 8/1992 | Vassiliadis et al. | 364/765 |

FOREIGN PATENT DOCUMENTS

| | | |
|---|---|---|
| 0118830 | 9/1984 | European Pat. Off. . |
| 0281132 | 9/1988 | European Pat. Off. . |
| 56-096328 | 10/1981 | Japan . |
| 58-149542 | 9/1983 | Japan . |

OTHER PUBLICATIONS

K. Hwang et al. "Computer Architecture and Parallel Processing" Pub. 1984 by McGraw-Hill Inc., pp. 325-328.

"Recursive Equations for Hardward Vinary Adders", 1989, Int'l J. Elect, vol. 67, No. 2, pp. 201-213, Vassiliadis.

Acosta, R. D., et al, "An Instruction Issuing Approach to Enhancing Performance in Multiple Functional Unit Processors", IEEE Transactions on Computers, Fall, C-35 No. 9, Sep. 1986, pp. 815-828.

Canozzi, A. J., et al., "Non-Sequential High-Performance Processing" IBM Technical Disclosure Bulletin, vol. 27, No. 5, Oct. 1984, pp. 2842-2844.

Chan, S., et al, "Building Parallelism into the Instruction Pipeline", High Performance Systems, Dec., 1989, pp. 53-60.

Murakami, K. et al, "SIMP (Single Instruction Stream/Multiple Instruction Pipelining): A Novel High-Speed Single Processor Architecture", Proceedings of the Sixteenth Annual Symposium on Computer Architecture, 1989, pp. 78-85.

Smith, J. E., "Dynamic Instructions Scheduling and the Astronautics ZS-1", IEEE Computer, Jul., 1989, pp. 21-35.

Smith, M. D., et al, "Limits on Multiple Instruction Issue", ASPLOS III, 1989, pp. 290-302.

(List continued on next page.)

*Primary Examiner*—Parshotam S. Lall
*Assistant Examiner*—Ken S. Kim
*Attorney, Agent, or Firm*—Lynn L. Augspurger

[57] ABSTRACT

Three high performance implementations for an interlock collapsing ALU are presented as alternative embodiments. The critical path delay of each embodiment provides reduction in delay. For one of the implementations the delay is shown to be an equivalent number of stages as required by a three-to-one adder assuming a commonly available bookset. The delay for the other two implementations is comparable to the three-to-one adder. In addition, trade-offs for the design complexity of implementation alternatives are set out. The embodiments achieve minimum delays without a prohibitive increase in hardware.

43 Claims, 11 Drawing Sheets

OTHER PUBLICATIONS

Tomasulo, R. M., "An Efficient Algorithm for Exploiting Multiple Arithmetic Units", Computer Structures, Principles, and Examples (Siewiorek, et al ed), McGraw-Hill, 1982, pp. 293-302.

Wulf, W. A. "The WM Computer Architecture" Computer Architecture News, vol. 16, No. 1, Mar. 1988, pp. 70-84.

Jouppi, N. P., et al, "Available Instruction-Level Parallelism for Superscalar Pipelined Machines", ASPLOS III, 1989, pp. 272-282.

Jouppi, N. P., "The Non-Uniform Distribution of Instruction-Level and Machine Parallelism and its Effect on Performance", IEEE Transactions on Computers, vol. 38, No. 12, Dec., 1989, pp. 1645-1658.

Ryan, D. E., "Intel's 80960: An Architecture Optimized for Embedded Control", IEEE Microcomputers, vol. 8, No. 3, Jun., 1988, pp. 63-76.

Colwell, R. P., et al, "A VLIW Architecture for a Trace Scheduling Complist", IEEE Transactions on Computers, vol. 37, No. 8, Aug. 1988, pp. 967-979.

Fisher, J. A., "The VLIW Machine: A Multi-Processor for Compiling Scientific Code", IEEE Computer, Jul., 1984, pp. 45-53.

Berenbaum, A. D., "Introduction to the CRISP Instruction Set Architecture", Proceedings of Compcon, Spring, 1987, pp. 86-89.

Bandyopadhyay, S., et al, "Compiling for the CRISP Microprocessor", Proceedings of Compcon, Spring, 1987, pp. 96-100.

Hennessy, J., et al, "MIPS: A VSI Processor Architecture", Proceedings of the CMU Conference on VLSI Systems and Computations, 1981, pp. 337-346.

Patterson, E. A., "Reduced Instruction Set Computers", Communications of the ACM, vol. 28, No. 1, Jan., 1985, pp. 8-21.

Radin, G., "The 801 Mini-Computer", IBM Journal of Research and Development, vol. 27, No. 3, May, 1983, pp. 237-246.

Ditzel, D. R., et al, "Branch Folding in the CRISP Microprocessor: Reducing Branch Delay to Zero", Proceedings of Compcon, Spring 1987, pp. 2-9.

Hwu, W. W., et al, "Checkpoint Repair for High-Performance Out-of-Order Execution Machines", IEEE Transactions on Computers vol. C36, No. 12, Dec., 1987, pp. 1496-1594.

Lee, J. K. F., et al, "Branch Prediction Strategies in Branch Target Buffer Design", IEEE Computer, vol. 17, No. 1, Jan. 1984, pp. 6-22.

Riseman, E. M., "The Inhibition of Potential Parallelism by Conditional Jumps", IEEE Transactions on Computers, Dec., 1972, pp. 1405-1411.

Archibold, James, et al, Cache Coherence Protocols: "Evaluation Using a Multiprocessor Simulation Model", ACM Transactions on Computer Systems, vol. 4, No. 4, Nov. 1986, pp. 273-398.

Baer, J. L., et al "Multi-Level Cache Hierarchies: Organizations, Protocols, and Performance" Journal of Parallel and Distributed Computing vol. 6, 1989, pp. 451-476.

Smith, A. J., "Cache Memories", Computing Surveys, vol. 14, No. 3, Sep., 1982, pp. 473-530.

Smith, J. E., et al, "A Study of Instruction Cache Organizations and Replacement Policies", IEEE Proceedings of the Tenth Annual International Symposium on Computer Architecture, Jun., 1983, pp. 132-137.

Vassiliadis, S., et al, "Condition Code Predictory for Fixed-Arithmetic Units", International Journal of Electronics, vol. 66, No. 6, 1989, pp. 887-890.

Tucker, S. G., "The IBM 3090 System: An Overview", IBM Systems Journal, vol. 25, No. 1, 1986, pp. 4-19.

IBM Publication No. SA22-7200-0, Principles of Operation, IBM Enterprise Systems Architecture/370, 1988.

The Architecture of Pipelined Computers, by Peter M. Kogge Hemisphere Publishing Corporation, 1981.

IBM Technical Disclosure Bulletin (vol. 33, No. 10A, Mar. 1991), by R. J. Eberhard.

HIGH PERFORMANCE INTERLOCK COLLAPSING SCISM ALU APPARATUS

RELATED APPLICATIONS

This application claims priority and is a continuation-in-part of the following applications:

(1) application Ser. No. 07/504,910, filed Apr. 4, 1990, now U.S. Pat. No. 5,051,940, issued Sep. 24, 1991, entitled "Data Dependency Collapsing Hardware Apparatus", the inventors being Stamatis Vassiliadis et al; and (2) application Ser. No. 07/619,868, filed Nov. 28, 1990, now U.S. Pat. No. 5,301,341, entitled "Overflow Determination for Three Operand ALUs in a Scalable Compound Instruction Set Machine", the inventors being Stamatis Vassiliadis et al.

This application relates to subject matter disclosed in:

(3) application Ser. No. 07/677,692, filed Mar. 29, 1991, entitled "Early SCIDSM ALU Status Determination", the inventors being James E. Phillips et al.

Furthermore, the subject matter of this application, while having other applications and uses, may be used in connection with a Scalable Compound Instruction Ser Machine (SCISM) as defined by the following additional applications:

(1) application Ser. No. 07/519,382, filed May 4, 1990, entitled "Scalable Compound Instruction Set Machine Architecture", the inventors being Stamatis Vassiliadis et al. now abandoned in favor of a continuing application U.S. Ser. No. 08/013,982, filed Feb. 5, 1993; and (2) application Ser. No. 07/519,384, filed May 4, 1990, entitled "General Purpose Compound Apparatus For Instruction Level Parallel Processors", the inventors being Richard J. Eickemeyer et al. now abandoned in favor of a continuing application U.S. Ser. No. 08/15,272 filed Feb. 5, 1993; and (3) application Ser. No. 07/522,219, filed May 10, 1990, entitled "Compounding Preprocessor For Cache", the inventors being Bartholomew Blaner et al. now U.S. Pat. No. 5,214,763 issued May 25, 1993; and (4) application Ser. No. 07/543,464, filed Jun. 26, 1990entitled "An In-Memory Processor for a Scalable Compound Instruction Ser. Machine Processor", the inventors being Richard Eickemeyer et al. now continued as U.S. Ser. No. 08/98,240, filed Jul. 29, 1993; and (5) Application Ser. No. 07/543,458, filed Jun. 26, 1990, entitled "Memory Management for Scalable Compound Instruction Set Machines With In-Memory Compounding", the inventors being Richard Eickemeyer et al., now U.S. Pat. No. 5,197,135 issued Mar. 23, 1993; and (6) application Ser. No. 07/642,011, filed Jan. 15, 1991, entitled "Compounding Preprocessor for Cache", the inventors being Bartholomew Blaner et al.; and (7) application Ser. No. 07/677,066, filed Mar. 29, 1991, entitled "System for Compounding Instructions for an Instruction Processor With Different Attributes With Apparatus for Handling Test and Data With Differing Reference Point Information and Backward Compounding Apparatus for Compound Instructions", the inventors being Richard Eickemeyer et al.; and (8) application Ser. No. 07/677,685, filed Mar. 29, 1991 entitled "System for Preparing Instructions for Instruction Processor and System With Mechanism for Branching in the Middle of a Compound Instruction", the inventors being S. Vassiliadis et al.

These co-pending applications and the present application are owned by the same assignee, namely, International Business Machines Corporation of Armonk, N.Y.

The descriptions set forth in these co-pending applications are hereby incorporated into the present application by reference.

FIELD OF THE INVENTION

This invention relates to the field of Arithmetic Logic Units (ALUs), and particularly to a new architecture which defines instructions that have an "add/logical combinatorial operation" which means combining all four of the following combinations: add-add; add-logical; logical-add; and logical-logical functions, and to an architecture in which two or more disassociated ALU operations are specified by a single interlock collapsing ALUs which responds to the parallel issuance of a plurality of separate instructions, each of which specifies ALU operations, and executes the instructions in parallel.

BACKGROUND OF THE INVENTIONS

Conventional architectures are scalar, represented by such systems as RISC, IBM System/360 and System/370. In addition there are such devices as have been described in Wulf et al., U.S. Pat. No. 4,819,155 and Oota, U.S. Pat. No. 4,852,040. See also, the article by W. A. Wulf proposed in Computer Architecture News, Mar., 1988, entitled "The WM Computer Architecture". The Wulf apparatus is for vector processing rather than scalar processing, but teaches two operands are combined in an ALU to produce a result in a first execution cycle, following which the result and a third operand are provide to a second ALU which produces a result in a second execution cycle. This reference hints at pipelining similar to superscalar machines which are known, as one way to improve performance.

Pipelining is a standard technique used by computer designers to improve the performance of computer systems. In pipelining an instruction is partitioned into several steps or stages for which unique hardware is allocated to implement the function assigned to that stage. If the cycle time of an n-stage pipeline implementation is assumed to be m/n, where m is the cycle time of the corresponding implementation not employing pipelining then the best pipeline implementation will have a cycle time of m/n. Another known technique is super-scaler, which permits instructions, grouped strictly on a first-in-first-out basis to be simultaneously issued. The superscaler machine was not designed for a scalable compound instruction set, where related instructions not necessarily originally written together, may be issued as a plural set unit instruction for execution in parallel.

The invention does not consider the parallel execution of instructions per se as novel, even though parallel execution of base instructions is achieved by the inventions, rather it concerns the execution in parallel or interlocked instructions. The System/370 sold by International Business Machines which can be made to execute in parallel certain interlocked instructions, and can perform with limitations the requirements of scalable compound instruction set machine as first disclosed in the reference applications, and there are such suggestions made in other applications as to possibilities which may be used, for example, U.S. Ser. No. 07/642,011 as other ALUs for a scalable compound instruction set machine. These existing processors have not been publicly used as such, and there has been no publication of the possibility of such a use, but the possibility has been described in some aspects in applications filed after the priority claimed herein.

Further, by way of background the first collapsing ALU was described in application Ser. No. 07/504,910, filed Apr. 4, 1990, entitled "Data Dependency Collapsing Hardware Apparatuses", the inventors being Stamatis Vassiliadis et al.; and in application Ser. No. 07,619,868, filed Nov. 28, 1990, entitled "Overflow Determination for Three-Operand ALUs in a Scalable Compound Instruction Set Machine", the inventors being Stamatis Vassiliadis et al., from which this application claims priority.

It is known to implement a three to one adder. It consists of a three to two carry save adder (CSA) followed by a two to one carry look ahead adder (CLA), as shown in FIG. 2. S. Vassiliadis and M. Putrino, recognized that the critical path in ALUs is usually limited by determination of result equal to zero. In "Condition code predictor for fixed-point arithmetic units," J. Electronics, vol. 66, no. 6, pp. 887–890, 1989, they proposed a method for predicting that the result is equal to zero for a two-to-one two's complement adder; however, as recognized by the author and one of the joint inventors here, that method does not apply for a three-to-one ALU.

A discussion of one known form of the two-to-one CLA can be found in S. Vassiliadis, "Recursive Equations for Hardware Binary Adders," Int. J. Electronics, vol. 67, no. 2, pp. 201–213, 1989, which discusses hardwired binary adders. This journal article may be referenced for definitions of the known quantities $G_n^x$ and $T_n$, which represent the pseudo-generate and transmit, respectively, at bit position n in the Boolean expressions which we use to describe the stages of the CLA employed in a described preferred embodiment of our inventions. For ease in understanding of our inventions, they have been precisely detailed in Boolean expressions and the booksets described in the description of our preferred embodiments. In the discussion which follow, only the generation of true logic values of a variable are presented in stage by stage delay. These assumptions, however, are not intended to an do not limit the applicability of the discussion and the devices presented since such a bookset is common in currently available technologies and extendable to other technologies having similar characteristics or equivalent functional power within their bookset.

The SCISM architecture is applicable not only to 370 architectures, but other architectures, including RISC, where it is desirable to enhance performance of applications which have been developed and which would desirably operate faster if there were parallel issuance and execution of specific plural instructions for an ALU. Such a system enables new hardware to execute old instructions at a more rapid rate, reducing the necessity of reprogramming old programs for a new machine having a new architecture.

SUMMARY OF THE INVENTIONS

It is the object of this invention to provide new devices for Arithmetic Logic Units (ALUs), and devices which are capable of implementation with an arhcitecture which defines instructions that have an "add/logical combinatorial operation" which means combining all four of the following combinations: add-add; add-logical; logical-add; and logical-logical functions, and to an architecture in which two or more disassociated ALU operations are specified by a single interlock collapsing ALUs which responds to the parallel issuance of a plurality of separate instructions, each of which specifies ALU operations, and executes the instructions in parallel. Thus a plurality of separate operands as a feature which the present inventions accommodate are passed to the execution unit (ALU) in the same execution cycle, and they may also be passed altogether with a third operand to the execution unit (ALU). Two results are produced and available at the end of a single execution cycle. One of the results may be produced by the first ALU and another single result may be produced by the second ALU.

Thus, in a data dependence collapsing hardware apparatus, will broadly have an instruction device for receiving a plurality of scalar instructions, a first of which produces a result used by the second of the scalar instructions, and there is a device which simultaneously issues a plurality of operands, at least two of which are used by the first and another of the scalar instructions, and the execution unit, under control signals indicating operations which execute the plurality of scalar instructions, produces in a single cycle a single result corresponding to the performance of the operations on the operands. (See U.S. Ser. No. 07/504, 910 referenced above for full details of such a proposed apparatus).

In such apparatus which implement a SCISM architecture there is need for simultaneously executing two instructions. A proposed structure may provide a carry-save adder (CSA) which generates sum and carry signals in response to three multi-bit binary operands. A carry look-ahead (CLA) adder is connected to the carry-save adder for generating a result in response to the sum and carry signals, the result represented a result achieved by execution of the series of plural binary arithmetic operations performed on the three multi-bit binary operands. The mechanism would include a logic circuit connected to the carry-save adder for producing a overflow signal, OF, representing an overflow condition resulting from the execution of the second of the binary arithmetic operations, the overflow signal produced in response to the operands and the sum and carry signals. Such a mechanism was disclosed U.S. Ser. No. 07/619,868, supra.

However, there is a need for an apparatus that executes in parallel "ionterlocked" instructions. Such "interlocks" are data dependency hazards, also called "write-read hazard" or "wire-read interlock" which exist when two (or more) instructions of a serial sequence are executed simultaneously or in parallel. In the machines utilizing an architecture which encounters such interlocks, there is a parallel issuance and execution of two separate instructions, both of which specify ALU operations. It is in this environment that the present improved embodiments with the various implementations suggested as useful for different purposes will be found application, and broadly, they will be applicable in reducing the logical dataflow problems which would result from a direct implementation of collapsing interlocks between instruction units of a compound instruction in order to improve the parallel issue and execution of instructions. This application deals with the execution in parallel of interlocked instructions. An interlock collapsing ALU which we have provided executes an instruction which interlocks with a previous instruction. A direct implementation, while possible, would result in a prohibitive cycle time because of serial representation of operations. Specifically, to perform interlock collapsing, the execution ALU must support more than only add/logical functions. The ALU must support arithmetic, arithmetic logicals, logicals, register transfer operations and all possible pair combinations among them, all of which we call "add/logical combinatorial operations". The disclosed embodiments reduce the number of stages required for implementation and provide faster performance of the desired operations, due to the reduction of stages and improved performance of the interlock collapsing apparatus which uses the ALU units presented hereby.

The apparatus in accordance with the inventions proposes an ALU which comprises a 3-1 adder, having a CSA and a 2-1 adder, which is capable of performing both two's complement and unsigned number arithmetic.

The preferred embodiments of the invention incorporate logic blocks along with a 3-1 adder block as a single mechanism, which is described herein by way of conventional non-limiting description in the form of Boolean equations.

In accordance with our inventions to collapse interlocks between two add type instructions, we use a carry-save adder (herein a CSA) along with a 2-1 adder implementations, presented by way of example in FIG. 2, to compute required 3-1 position. While we use a technology bookset, and certain adder schemes illustrated thereby for a 32 bit machine, the inventions should be understood to not be so limited, and applicable to other adder schemes, technology and width of addition.

Heretofore, we know of no solution which provides interlock collapsing hardware, and the implementations show not only that a solution exists, but such a solution may require no more delay than does the known 3-1 binary addition. We believe that the use of a 3-1 adder for two's complement numbers is unprecedented. While N input adders with N>2 are known, they have before been used only for BINARY and UNSIGNED number representation. In accordance with our inventions a 3-1 adder is used for instructions that also incorporate two's complement representations. Thus, we disclose a unit for collapsing interlocked instructions WITH or WITHOUT additional logic.

The implementation of the improvements herein with the ALU proposed resolves any interlock problem of instruction level parallel machines. The circuitry described permits the execution in parallel of interlocked instructions for scalable compound instruction set machine architectures.

While after reviewing the disclosure, it may be realized by some that a solution to the interlocked collapsing problem could be fashioned by taking two passes through an ALU requiring an extra machine cycle for execution, with a parallel computer implementation. However, another solution also exists which would implement and require two concantenated ALU's leading to a longer execution cycle. However, this second solution would take almost twice as much time as the preferred embodiments, and be less than ideal with respect to performance for implementing parallel processing. Accordingly, the feasibility of a single pass interlock collapsing ALU with no cycle time penalties is the result of our work, as illustrated by the implementations of this application.

These and other improvements are detailed in the following detailed description which described our preferred embodiments as implementations for use in the manner described. For a better understand of these implementations and inventions, together with the advantages and features which may be employed, reference should be hade to the co-pending applications for some additional detailed background. Further, specifically as to the improvements described herein, reference should be made to the following description and the below-described drawings.

BRIEF DESCRIPTION OF THE DRAWINGS

FIG. 10 illustrates Dataflow for fast implementation of interlock collapsing ALU - implementation 2 not support post adder logic operations, while

INTRODUCTION TO THE PREFERRED EMBODIMENT IMPLEMENTATIONS

Figure 1:
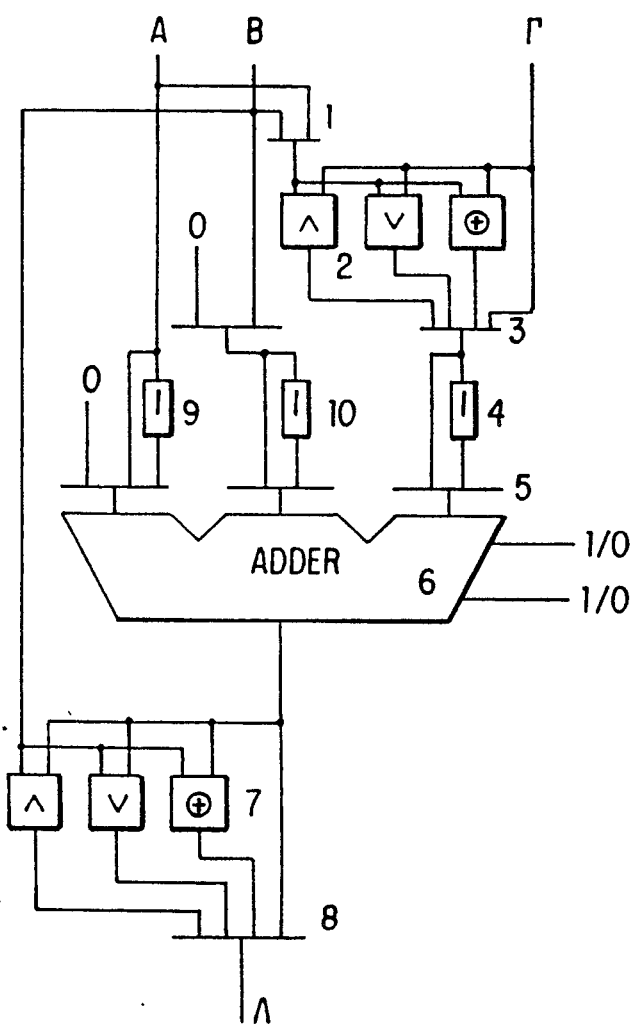
FIG. 1 illustrates Logical Dataflow for interlock collapsing execution ALU which has been described in detailed in U.S. Ser. No. 07/504,910, supra.

A method was proposed for collapsing interlocks between instructions in order to improve the parallel issue and execution of instructions in U.S. Ser. No. 07/504,910 referenced above. This method consists of a three-to-one ALU designed to execute functions that arise for all instruction sequences whose data interlocks are to be collapsed. The functions arising from collapsing interlocks result in a three-to-one addition as well as functions requiring logical operations that either follow or precede arithmetic operations and a logical operation that follows another logical operation. The later functions that require logical operations preceding or following arithmetic operations and logical operations preceding logical operations lead to a novel concept of a three-to-one ALU. A logical representation of the ALU dataflow was given to U.S. Ser. No. 07/504,910 of Apr. 4, 1990, supra. and is shown in FIG. 1.

A direct implementation of this logical dataflow would result in a prohibitive cycle time because of the serial representation of the operations. For example, consider a CMOS technology with a bookset library having two-way XOR and XOR-INVERT; three-way AND, OR, AND-INVERT, and OR-INVERT; and up to ±3×4 AO books where + indicates the AND-OR function and − indicates the AND-OR-INVERT function. This is the same bookset assumed in Int. J. Elec., vol. 67, No. 2, supra. Furthermore, assume that every book in this library constitutes one stage of delay. While these assumptions are restricted to a particular technology, they do not limit the applicability of the following discussion since such a booklet is common in currently available technologies and is extendable to other technologies having similar characteristics or equivalent functional power within their booksets Int. J. Elec., vol. 67, No. 2, supra. With this definition of a stage and assuming the above book set, the number of stages required in the critical path of the ALU described in FIG. 1 are as follows:

1. 1 stage for the multiplexer (1)
2. 1 stage for the logical operations denoted as (2)
3. 1 stage for the multiplexer (3)
4. 1 stage for the inverter (4)
5. 1 stage for the multiplexer (5)
6. 1 stage for the 3-to -2 CSA and 4 stages for the high-speed 2-to-1 CLA See Int. J. Elec. Vol 67, No. 2, supra. (6)
7. 1 stage for the logical operations denoted as (7)
8. 1 stage for the multiplexer (8).

Consequently, the total number of stages required for a direct implementation of FIG. 1 is 12 stages.

FIG. 1 illustrates the logical dataflow for interlock collapsing execution ALU, and the dataflow given in U.S. Ser. No. 07/504,910 incorporated herein by reference and shown in FIG. 1 was derived assuming that the ALU would share a general purpose register (GPR) port with a second two-to-one ALU. If another GPR port is available so that all inputs to both ALU's are independent, then the two-to-one multiplexer designated as 1 in FIG. 1. can be removed. In addition, the inverters 9 and 10, though not in the critical path, can also be removed from the dataflow. The number of stages required in the critical path is thereby reduced to 11 stages. In either case, the number of stages in the critical path constitutes a prohibitive delay that may penalize the achievable cycle time of the machine unless an innovative approach to reducing the number of stages required to implement the interlock collapsing ALU can be found.

A scheme that improves the performance of the interlock collapsing apparatus is presented in this paper. In this scheme, the logical operations are performed in parallel with the execution of the arithmetic operations. The scheme is presented by demonstrating its application in the critical path of a 32 bit ALU assuming the bookset presented previously. The scheme, however, is not peculiar to this bookset, to the width of the ALU, or to the addition scheme used in the presentation. The implementation allows the collapsing between combinations of logical and arithmetic operations to be performed in the same number of stages as a three-to-one adder. The benefits, however, also apply to all operations through the ALU since the path through the ALU is minimized.

BACKGROUND OF ALU REQUIREMENTS

The functional requirements of the SCISM ALU were given in U.S. Ser. No. 07/504,910, supra. For the purposes of this discussion, the functional requirements of the ALU executing the second instruction can be divided into four categories. These categories along with the type of interlocked instruction sequence that leads to the functions are:

| | |
|---|---|
| Category 1: $\pm A \pm B \pm \Gamma$ | Arithmetic followed by Arithmetic |
| Category 2: $B \pm (A \text{ LOP } \Gamma)$ | Logical followed by Arithmetic |
| Category 3: $B \text{ LOP } (A \pm \Gamma)$ | Arithmetic followed by Logical |
| Category 4: $B \text{ LOP } (A \text{ LOP } \Gamma)$. | Logical followed by Logical | in which A, B, and $\Gamma$ represent the three input operands fed to the ALU as shown in FIG. 1, while ± represents addition/subtraction and LOP represents one of the logical operations, bitwise AND, Or, or XOR. Subtract operations, however, can be considered as add operations with the appropriate one's complement of the operand and the supply of hot one's. To simplify the exposition, all addition/subtraction operations are represented as an addition operation in the following discussion. With this simplification, the categories reduce to:

| | |
|---|---|
| Category 1: A + B + Γ | Arithmetic followed by Arithmetic |
| Category 2: B + (A LOP Γ) | Logical followed by Arithmetic |
| Category 3: B LOP (A + Γ) | Arithmetic followed by Logical |
| Category 4: B LOP (A LOP Γ) | Logical followed by Logical. |

Thus, the first category reduces to a three-to-one addition operation. In addition, categories one and two cover the functions that must be executed when the first and second instructions are not interlocked. For example, to execute A+Γ the first category is specified with B forced to zero. Similarly, the function ALOPΓ is executed by specifying the second category and forcing B to zero. Thus, the two operand ALU functions become special cases of the general categories given above and will not be considered separately.

Figure 2:
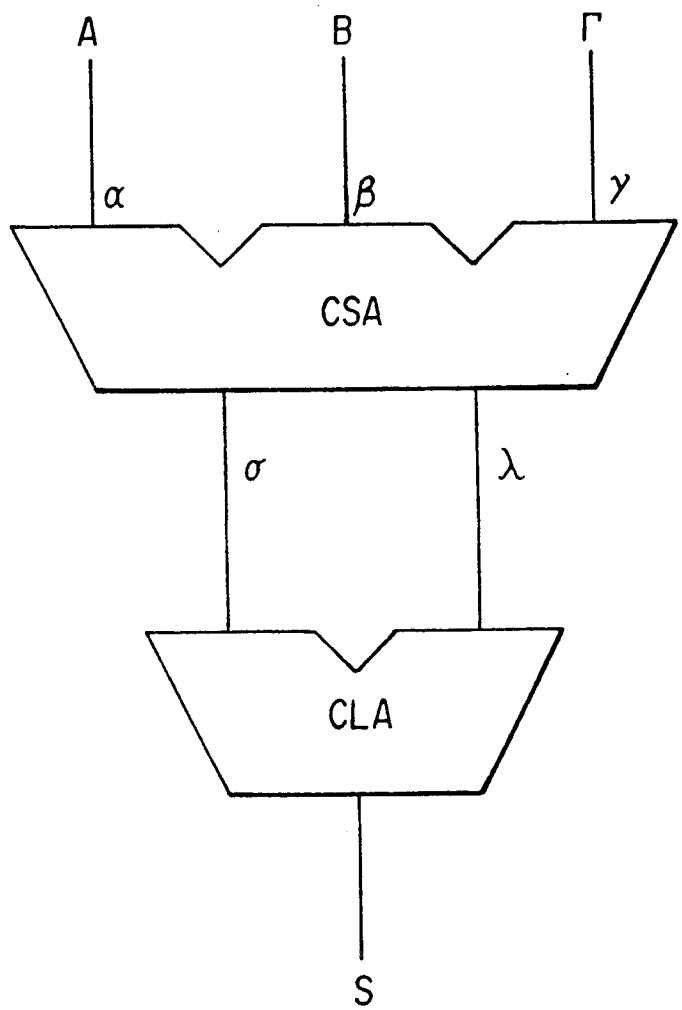
FIG. 2 illustrates Dataflow for three-to-one adder.

FIG. 2 illustrates dataflow for three-to-one adder. As implied above, the first category can be implemented with a three-to-one adder. The implementation of the three-to-one addition is well known. It consists of a three-to-two carry save adder, CSA, followed by a two-to-one carry lookahead adder, CLA, as shown in FIG. 2 The CSA can be implemented in one stage with the assumed bookset if both polarities of the operands are available; otherwise, a specially designed three-to-two CSA book would be required to allow its computation in one stage. The explicit expressions for the implementation are:

$$\sigma_i = \alpha_i \bar{\beta_i} \bar{\gamma_i} + \bar{\alpha_i}\beta_i\bar{\gamma_i} + \bar{\alpha_i}\bar{\beta_i}\gamma_i + \alpha_i\beta_i\gamma_i \quad 0 \leq i \leq 31$$

$$\lambda_i = \alpha_i\beta_i + \alpha_i\gamma_i + \beta_i\gamma_i \quad 0 \leq i \leq 31$$

$$\lambda_i = \tau_2 \quad i = 32$$

where $\alpha_i$, $\beta_i$, and $\gamma_i$ represent the inputs to the CSA at bit position i, $\tau_2$ represents one of two hot one's supplied to the ALU, and $\sigma_i$ and $\lambda_i$ represent the sum and the carry, respectively, that are produced. The sum at bit position i, $\sigma_i$, and the carry at i+1, $\lambda_{i+1}$, for all i where $0 \leq i \leq 31$, are then presented as inputs to the CLA to be added, thereby producing the desired three-to-one add. The three-to-one addition with the required alignment can be described by the following:

$$\begin{array}{c}\alpha_0\alpha_1\ldots\alpha_{31}\\ \beta_0\beta_1\ldots\beta_{31}\\ \underline{\gamma_0\gamma_1\ldots\gamma_{31}}\\ \sigma_0\sigma_1\ldots\sigma_{31}\\ \underline{\lambda_0\lambda_1\ldots\lambda_{31}}\\ S_0S_1\ldots S_{31}\end{array}$$

in which $S_i$ represents the sum at bit i of the three-to-one addition, A discussion of the implementation of the two-to-one CLA can be found in Int. J. Elec., vol 67, No. 2, supra.

Execution of the functions in the remaining categories requires that the inputs to the CLA be other than the outputs of the CSA. For example, to execute the second category, B+(A LOP Γ), one input to the CLA needs to be B while the other needs to be the logical operation, A LOP Γ, where LOP stands for one of the logical operations as already noted. As a further example, to execute the third category, the inputs to the CLA must such that the function A+Γ is produced by the CLA. This can be accomplished by passing A to one input of the CLA and Γ to the other input. An alternative solution is to pass the outputs of a two-to-two CSA, which could be accomplished by forcing one of the inputs to a three-to-two CSA to zero, to the inputs of the CLA. In this case, one input of the CLA would receive:

$$A \vee Γ,$$

while the other would receive:

$$AΓ$$

where $\vee$ represents bitwise XOR and juxtaposition designates bitwise AND. For the present discussion, the second option is chosen. The reason for this choice should become apparent later in the discussion.

The inputs required at the CLA to execute the desired functions are summarized in Table 1. These CLA input specifications allow the CLA to compute A+Γ and ALOPΓ as well as A+B+Γ and B+(ALOPΓ) which were discussed above. The functions A+Γ and ALOPΓ can be produced by setting the operand B supplied to the three-to-one adder to zero and executing A+B+Γ and B+(ALOPΓ), respectively. Therefore, execution of the functions BLOP(A+Γ) and BLOP(ALOPΓ) can be produced by a post-adder logic function block whose operands are the output of the CLA used in the three-to-one add, $S_i$, $B_i$. This logic function block must be capable of executing bitwise AND, OR, and XOR. The output of the ALU is then the output of the logic function block or the output of the CLA depending on the function to be performed by the ALU. The ALU output, therefore, can be expressed as:

$$\Lambda_i S_i \Xi_{ADD} + (S_i + B_i) \Xi_{OR} + (S_i B_i) \Xi_{AND} + (S_i \vee B_i) \Xi_{XOR}$$

where $\Lambda_i$ represents the output of the ALU, $S_i$ represents the sum from the CLA as discussed above, and $\Xi_{ADD}$, $\Xi_{OR}$, $\Xi_{AND}$, and $\Xi_{XOR}$ represent control signals specifying the function to be performed.

TABLE 1

Inputs for Performing Interlock Collapsing Operations
Inputs to the ith bit position of the CLA to Perform Operations

| Operation | CLA Input 1 | CLA Input 2 |
|---|---|---|
| A + B + Γ | $A_i B_i \bar{Γ}_i + \bar{A_i}\bar{B_i}Γ_i + \bar{A_i}B_i\bar{Γ}_i + A_i \bar{B_i}\bar{Γ}_i$ | $A_i B_i + A_i Γ_i + B_i Γ_i$ |
| B + (A LOP Γ) | $B_i$ | $A_i$ LOP $Γ_i$ |
| B LOP (A + Γ) | $A_i \vee Γ_i$ | $A_i Γ_i$ |
| B LOP (A LOP Γ) | 0 | $A_i$ LOP $Γ_i$ |

An alternative ALU organization is to dedicate logic to produce in parallel each of the inputs given in Table 1 and select the appropriate input for the CLA via a multiplexer. In addition, the output of the CLA could be passed to a logic function block whose remaining input is the operand, B, to produce the logical operations between B and either $A+\Gamma$ or A LOP $\Gamma$. Though the implementation of parallel blocks before the CLA reduces the critical path of the ALU when compared to an implementation organized according to FIG. 1, it results in a significant hardware expense and requires a four-to-one multiplexer in the critical path to select the appropriate output from these functional blocks. The use of logic blocks following the CLA lengthens the critical path.

In the sections to follow, three implementations are presented that reduce the critical path in the three-to-one ALU without prohibitively increasing the hardware expense. Each of these implementations consist of reducing the complexity of the logic function block preceding the CLA so that the required functions can be implemented in the same number of stages as the CSA, paralleling the pre-CLA logical block with the CSA, controlling the outputs from the CSA and the pre-CLA logic block to meet the input requirements of the CLA as set forth in Table 1, embedding the selection between the pre-CLA logical block output and one of the CSA outputs within the first stage of the CLA, and embedding the post-CLA logical operations within the CLA. Two of the three schemes are very similar in that both control the outputs of the CSA by controlling its inputs. Their requirements on various pieces of the logic within the ALU are also very similar; therefore, their implementations are presented together. The third implementation, however, controls the outputs of the CSA within the CSA itself. As a result, the CSA implementation as well as the ALU controls differ somewhat from those of the first two schemes. Also, the inputs into the CLA are obtained differently for this scheme; therefore, it is presented separately. Finally, the extension of the above schemes to an interlock collapsing ALU, in which collapsing of interlocks is not supported when an instruction specifying an ALU operation is followed by a second instruction specifying a logical operation, are discussed. The potential advantage of such an ALU is that condition codes can be set earlier in the execution cycle as is discussed in detail in co-pending application U.S. Ser. No. 07/677,692, filed Mar. 29, 1991, entitled "Early SCISM ALU Status Determination.

IMPLEMENTATIONS CONTROLLING INPUTS TO THE CSA

In this section two similar schemes for implementing the three-to-one ALU are presented assuming the bookset presented in the introductory section and background of the inventions reference, Int. J. Elec. Vol 67, No. 2, supra.. First the pre-CLA logic function block is minimized. Second, the requirements on the outputs of the CSA are considered and reflected to the controls on the inputs to the CSA. From these results, the carry from the CSA is chosen for pairing with the output of the logic function block to provide one of the inputs to the CLA. Consequently, the selection between the CSA carry and the output of the logic function block is embedded in the first stage of the CLA. The post-CLA logic functions are then embedded into the CLA and shown to be implementable in an identical number of stages as a conventional CLA. The above results are then combined and applied to generate a stage by stage calculation of $\Lambda_0$, the MSB from the ALU, which constitutes the critical path. Finally, the dataflow for the two implementations are presented.

Minimization of the Pre-Adder Logical Operations

To enable the embedding of the selection between competing inputs within the CLA, the number of competing inputs must be narrowed to two. For this to be accomplished without adding delay in the critical path, the complexity of the logical function block preceding the CLA must be reduced to the point that it can be implemented in the same number of stages as the CSA. For the assumed bookset, this constitutes a single stage.

As described in U.S. Ser. No. 07/504,910, supra. the pre-CLA logical functions that must be executed are two-way OR, AND, XOR, OR-INVERT, AND-INVERT, and XOR-INVERT. Assume that the ALU is provided with four control signals for controlling the operation resulting from the logic blocks as follows:

| Signal | Description |
| --- | --- |
| $\Omega_{AND}$ | AND operands 1 and 2 |
| $\Omega_{OR}$ | OR operands 1 and 2 |
| $\Omega_{XOR}$ | COR operands 1 and 2 |
| $\Omega_I$ | Invert the result of the logical operation. |

With these signals the execution of the logical operations can be expressed as:

$$L_i = (A_i \Gamma_i \Omega_{AND} \overline{\Omega_I}) + ((A_i + \Gamma_i) \Omega_{OR} \overline{\Omega_I}) + ((A \vee \Gamma_i) \Omega_{XOR} \overline{\Omega_I}) + (\overline{A_i \Gamma_i} \Omega_{AND} \Omega_I) + (\overline{A_i + \Gamma_i} \Omega_{OR} \Omega_I) + (\overline{A_i \vee \Gamma_i} \Omega_{XOR} \Omega_I).$$

The above expression for the logical function requirements is not directly implementable in one stage using the assumed bookset and must be reduced. Given that:

$$A_i \vee \Gamma_i = \overline{A_i} \Gamma_i + A_i \overline{\Gamma_i},$$

and, $$\overline{A_i \vee \Gamma_i} = A_i \Gamma_i + \overline{A_i} \overline{\Gamma_i},$$

then, $$L_i = (A_i \Gamma_i \Omega_{AND} \overline{\Omega_I}) + ((A_i + \Gamma_i) \Omega_{OR} \overline{\Omega_I}) + ((\overline{A_i} \Gamma_i + A_i \overline{\Gamma_i}) \Omega_{XOR} \overline{\Omega_I}) + (\overline{A_i \Gamma_i} \Omega_{AND} \Omega_I) + (\overline{A_i + \Gamma_i} \Omega_{OR} \Omega_I) + ((A_i \Gamma_i + \overline{A_i} \overline{\Gamma_i}) \Omega_{XOR} \Omega_I).$$

Applying Boolean distribution produces:

$$L_i = A_i \Gamma_i \Omega_{AND} \overline{\Omega_I} + A_i \Omega_{OR} \overline{\Omega_I} + \Gamma_i \Omega_{OR} \overline{\Omega_I} + \overline{A_i} \Gamma_i \Omega_{XOR} \overline{\Omega_I} + A_i \overline{\Gamma_i} \Omega_{XOR} \overline{\Omega_I} + \overline{A_i \Gamma_i} \Omega_{AND} \Omega_I + \overline{A_i + \Gamma_i} \Omega_{OR} \Omega_I + A_i \Gamma_i \Omega_{XOR} \Omega_I + \overline{A_i} \overline{\Gamma_i} \Omega_{XOR} \Omega_I.$$

But by DeMorgan's Theorem, $$\overline{A_i \Gamma_i} = \overline{A_i} + \overline{\Gamma_i}$$

and, $$\overline{A_i + \Gamma_i} = \overline{A_i} \overline{\Gamma_i}.$$

Substituting these results into the expression for $L_i$ produces:

$$L_i = A_i\Gamma_i\Omega_{AND}\overline{\Omega}_l + A_i\Omega_{OR}\overline{\Omega}_l + \Gamma_i\Omega_{OR}\overline{\Omega}_l$$
$$+ \overline{A}_i\Gamma_i\Omega_{XOR}\overline{\Omega}_l + A_i\overline{\Gamma}_i\Omega_{XO}$$
$$R\overline{\Omega}_l + (\overline{A}_i + \overline{\Gamma}_i)\Omega_{AND}\Omega_l + \overline{A}_i\overline{\Gamma}_i\Omega_{OR}\Omega_l$$
$$+ A_i\overline{\Gamma}_i\Omega_{XOR}\Omega_l\overline{A}_i\overline{\Gamma}_i\Omega_{XOR}\Omega_l$$

$$L_i = A_i\Gamma_i\Omega_{AND}\overline{\Omega}_l + A_i\Omega_{OR}\overline{\Omega}_l + \Gamma_i\Omega_{OR}\overline{\Omega}_l$$
$$+ \overline{A}_i\Gamma_i\Omega_{XOR}\overline{\Omega}_l + A_i\overline{\Gamma}_i\Omega_{XOR}\overline{\Omega}_l + \overline{A}_i\Omega_{AND}\Omega_l$$
$$+ \overline{\Gamma}_i\Omega_{AND}\Omega_l + \overline{A}_i\overline{\Gamma}_i\Omega_{OR}\Omega_l$$
$$+ A_i\overline{\Gamma}_i\Omega_{XOR}\Omega_l + \overline{A}_i\Gamma_i\Omega_{XOR}\Omega_l.$$

This expression for $L_i$ still can not be implemented with the assumed bookset in the same number of stages as the CSA. However, by specifying that the operands be supplied to the ALU with the polarity shown in Table 2 the expression for $L_i$ can be significantly reduced. In this Table 2, a T indicates that the operand is to be provided with its true value while a ¬ entry indicates that the operand is to be inverted before being supplied to the ALU. Such a requirement does not add to a critical path when compared to a two-to-one ALU since the inversion of operands is required to execute subtraction and multiplexing of operands is required for single operand functions. With these input specifications $L_i$, expressed as:

$$L_i = L_{li}(\Omega_{OR}\overline{\Omega}_l + \Omega_{AND}\Omega_l) + L_{ri}(\Omega_{OR}\overline{\Omega}_l$$
$$+ \Omega_{AND}\Omega_l$$
$$+ L_{li}L_{ri}(\Omega_{AND}\overline{\Omega}_l + \Omega_{XOR}\Omega_l + \Omega_{XOR}\overline{\Omega}_l)$$
$$+ \overline{L}_{li}\overline{L}_{ri}(\Omega_{OR}\Omega_l$$
$$+ \Omega_{XOR}\overline{\Omega}_l\Omega_{XOR}\Omega_l),$$

where $L_{li}$ and $L_{ri}$ represent the left and right inputs to the logic function block, respectively, at bit position i, can produce all desired logical operations as is shown in Table 3. The table makes use of the following reduction in the form of the control signals. First, the control signals have been collected and are contained within parentheses. These signals can be generated either in an earlier cycle or during the GPR array access and supplied as input to the ALU. Therefore, three control signals to the ALU can be defined as:

$$\Omega_{OALASL}\Omega_{OR}\overline{\Omega}_l + \Omega_{AND}\Omega_l$$

$$\Omega_{XAAL} = \Omega_{XOR}\overline{\Omega}_l + \Omega_{XOR}\Omega_l + \Omega_{AND}\overline{\Omega}_l = \Omega_{XOR} + \Omega_{AND}\overline{\Omega}_l$$

$$\Omega_{XOSL} = \Omega_{XOR1}\overline{\Omega}_l + \Omega_{XOR}\Omega_l + \Omega_{OR}\Omega_l = \Omega_{XOR} + \Omega_{OR}\Omega_l.$$

These signals, which are used in Table 3, can be substituted into the reduced expression for $L_i$ to give:

$$L_i = L_{li}\Omega_{OALASL} + L_{ri}\Omega_{OALASL} + L_{li}L_{ri}\Omega_{XAAL} + \overline{L}_{li}\overline{L}_{ri}\Omega_{XOSL}.$$

Figure 3:
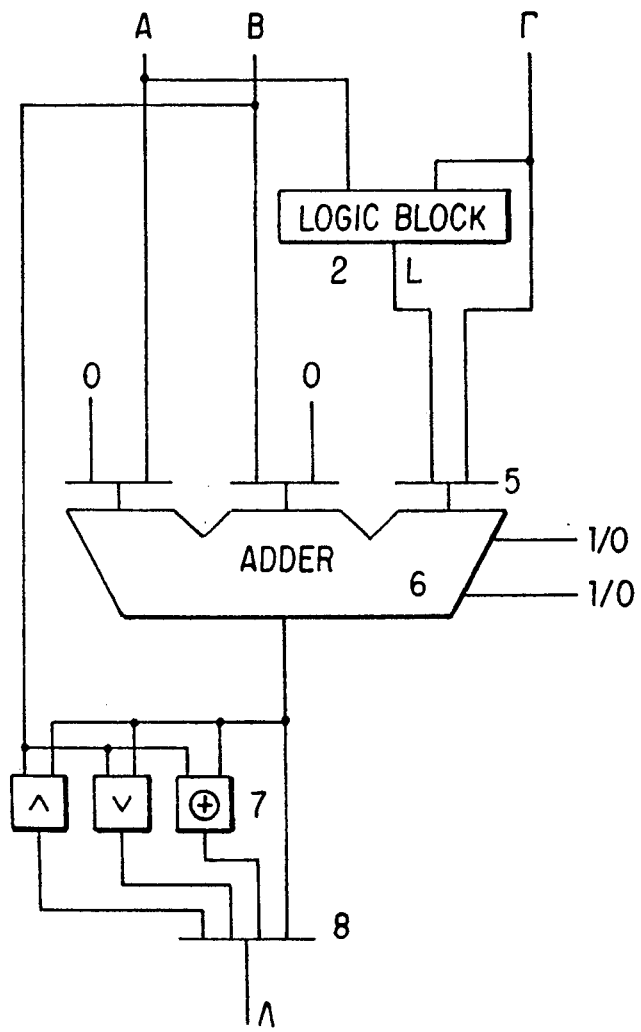
FIG. 3 illustrates Logical Dataflow for interlock collapsing execution ALU with logical functions combined into logical block.

Expressing the logic function block in this fashion demonstrates that it can be implemented in one stage using a 3×4 AO gate. The results of this expression are either the desired logical operation on A and Γ or zero when a logical operation is not required. The dataflow for the ALU incorporating this logic block is shown in FIG. 3, which illustrates the logical dataflow for interlock collapsing execution ALU with logical functions combined into a logical block.

TABLE 2

Input Specification for ALU to Reduce Logical Function

| Active Controls | Operand 1 | Operand 2 |
|---|---|---|
| $\Omega_{AND}, \overline{\Omega}_l$ | T | T |
| $\Omega_{OR}, \overline{\Omega}_l$ | T | T |
| $\Omega_{XOR}, \overline{\Omega}_l$ | T | ¬ |
| $\Omega_{AND}, \Omega_l$ | ¬ | ¬ |
| $\Omega_{OR}, \Omega_l$ | T | T |
| $\Omega_{XOR}, \Omega_l$ | ¬ | ¬ |

TABLE 3

Logic Block Output from Reduced Logic Function Block

| Active ctls | $L_{li}$ | $L_{ri}$ | $\Omega_{AND}$ | $\Omega_{OR}$ | $X_{XOR}$ | $\Omega_l$ | $L_{li}\Omega_{XOALASL}$ | $L_{ri}\Omega_{XOALASL}$ | $L_{li}L_{ri}\Omega_{XAAL}$ | $\overline{L}_{li}\overline{L}_{ri}\Omega_{XOSL}$ | $L_i$ |
|---|---|---|---|---|---|---|---|---|---|---|---|
| $\Omega_{AND}, \overline{\Omega}_l$ | $A_i$ | $\Gamma_i$ | 1 | 0 | 0 | 0 | 0 | 0 | $A_i\Gamma_i$ | 0 | $A_i\Gamma_i$ |
| $\Omega_{OR}, \overline{\Omega}_l$ | $A_i$ | $\Gamma_i$ | 0 | 1 | 0 | 0 | $A_i$ | $\Gamma_i$ | 0 | 0 | $A_i + \Gamma_i$ |
| $\Omega_{XOR}, \overline{\Omega}_l$ | $A_i$ | $\overline{\Gamma}_i$ | 0 | 0 | 1 | 0 | 0 | 0 | $A_i\overline{\Gamma}_i$ | $\overline{A}_i\Gamma_i$ | $A_i\overline{\Gamma}_i + \overline{A}_i\Gamma_i$ |
| $\Omega_{AND}, \Omega_l$ | $\overline{A}_i$ | $\overline{\Gamma}_i$ | 1 | 0 | 0 | 1 | $\overline{A}_i$ | $\overline{\Gamma}_i$ | 0 | 0 | $\overline{A}_i + \overline{\Gamma}_i$ |
| $\Omega_{OR}, \Omega_l$ | $A_i$ | $\Gamma_i$ | 0 | 1 | 0 | 1 | 0 | 0 | 0 | $\overline{A}_i\overline{\Gamma}_i$ | $\overline{A}_i\overline{\Gamma}_i$ |
| $\Omega_{XOR}, \Omega_l$ | $\overline{A}_i$ | $\overline{\Gamma}_i$ | 0 | 0 | 1 | 1 | 0 | 0 | $\overline{A}_i\overline{\Gamma}_i$ | $A_i\Gamma_i$ | $\overline{A}_i\overline{\Gamma}_i + A_i\Gamma_i$ |

CSA Outputs to Support parallel Logical Operations

The input requirements for the CLA to allow the desired functions to be produced by the interlock collapsing ALU were given in the section relating to Background ALU Requirements. As mentioned in that section, parallel blocks could implemented to produce the desired inputs with the appropriate input selected by a four-to-one multiplexer. In this section all of the required CLA inputs, other than those generated by the logical function block, are shown to be obtainable from the CSA through the proper control of its inputs. This reduces the hardware necessary to implement the ALU as well as reducing the multiplexing requirements to a two-to-one, instead of the above four-to-one, multiplexer.

The equation for the sum, σ, and carry λ, from the CSA can be expressed as:

$$\sigma_i = \alpha_i\overline{\beta}_i\overline{\gamma}_i + \overline{\alpha}_i\beta_i\overline{\gamma}_i + \overline{\alpha}_i\overline{\beta}_i\gamma_i + \alpha_i\beta_i\gamma_i \quad 0 \leq i \leq 31.$$

$$\lambda_i = \alpha_i\beta_i + \alpha_i\gamma_i + \beta_i\gamma_i \quad 0 \leq i \leq 31$$

$$\lambda_i = \tau_2 \quad i = 32$$

where $\alpha_i$, $\beta_i$, and $\gamma_i$ represent the three inputs to the CSA and $\tau_2$ represents a hot one supplied to the ALU. In this designation, i represents the bit position within the adder with the sign or most significant bit, MSB, designated as bit 0. By forcing the inputs, $\alpha_i$ and $\gamma_i$ to 0 when the first instruction of an interlocked instruction pair specifies a logical operation, the sum and carry become:

$$\sigma_i = 0\overline{\beta}_i 1 + 1\beta_i 1 + 1\overline{\beta}_i 0 + 0\beta_i 0 = \beta_i \quad 0 \leq i \leq 31$$

$$\lambda_i = 0\beta_i + 00 + \beta_i 0 = 0 \quad 0 \leq i \leq 31$$

$$\lambda_i = \tau_2 = 0 \quad i = 32.$$

Since $\beta_i$ corresponds to the input $B_i$ then:

$$\sigma_i 50 B_i$$

This along with the output of the logic block meet the CLA input requirements for generating the function of the second category as presented in the Background ALU Requirements section. It is noted that when executing pre-adder logical functions, the operands A and $\Gamma$ are fed to the logic function block with the polarity required to implement the desired logical functions. At the same time, the inputs to the CSA, $\alpha$ and $\gamma$, are forced to 0 so that the sum from the CSA, $\sigma$, corresponds to the input B while the carry, $\lambda$, is zero. When a three-to-one add type function is required, the logic function block places no requirements on the input (the output is forced to zero by the control signals within the logic function block). Thus, the operands A and $\Gamma$ are fed to the CSA with the polarity need to execute the specified add type function.

To meet the CLA input requirements, $A \vee \Gamma$ and $A\Gamma$, for the third category, the inputs to the CSA, $\alpha_i$ and $\gamma_i$, need to be presented the ALU inputs A and $\Gamma$ respectively, while the CSA input, $\beta_i$, needs to be forced to 0. With these values, the CSA sum and carries become:

$$\sigma_i = \alpha_i 1 \overline{\gamma}_i + \overline{\alpha}_i 0 \gamma_i + \overline{\alpha}_i 1 \gamma_i + \alpha_i 0 \gamma_i = \alpha_i \vee \gamma_i \quad 0 \leq i \leq 31$$

$$\lambda_i = \alpha_i 0 + \alpha_i \gamma_i + 0\beta_i = \alpha_i \gamma_i \quad 0 \leq i \leq 31$$

$$\lambda_i = \tau_2 = 0 \quad i = 32.$$

With the inputs applied to the CSA as given above, the desired inputs to the CLA are achieved to allow $A + \Gamma$, in which + denotes addition, to be produced as required by the third category.

The CLA inputs required to execute the fourth category are 0 and ALOP$\Gamma$.

The later input is available from the logical function block. Therefore, a 0 needs to be produced on the CSA sum, $\sigma$. Since:

$$\sigma_i = \alpha_i \overline{\beta}_i \overline{\gamma}_i + \overline{\alpha}_i \beta_i \overline{\gamma}_i + \overline{\alpha}_i \overline{\beta}_i \gamma_i + \alpha_i \beta_i \gamma_i \quad 0 \leq i \leq 31$$

$\tau$ can be made zero by forcing all of the inputs to the CSA to 0. No additional hardware is required within the data path since the support of earlier functional categories already requires the capability to force each input to the CSA to 0. The carry resulting from these inputs is also 0 as desired.

Figure 4:
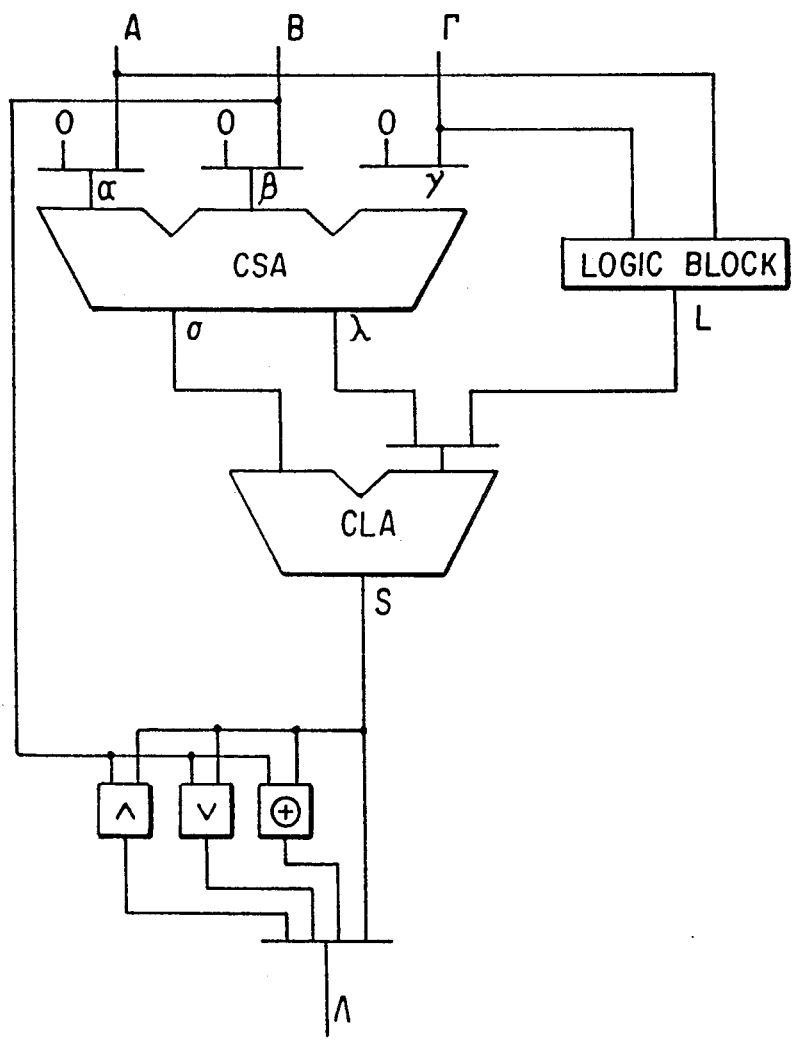
FIG. 4 illustrates Logical Dataflow for interlock collapsing execution ALU that avoids 4-1 mux in sum path and reduces logic requirements.

The functional blocks supplying the inputs to the CLA; therefore, have been reduced to two, the CSA and the logical function blocks. The sum, $\sigma$, can be directly wired to one of the inputs to the CLA as it always supplies an appropriate input. The second input to the CLA is obtained by selecting either the carry from the CSA, $\lambda$, or the output of the logical function block, L. This selection can be implemented with a two-to-one multiplexer as shown in FIG. 4, which illustrates a logical dataflow for interlock collapsing execution ALU that avoids a 4-1 mux (multiplexor) in sum path and reduces logic requirements. A better approach for selecting between the carry and the logical function output is presented in the next section.

Choosing Between the CSA Carry and the Logic Block Output

Figure 5:
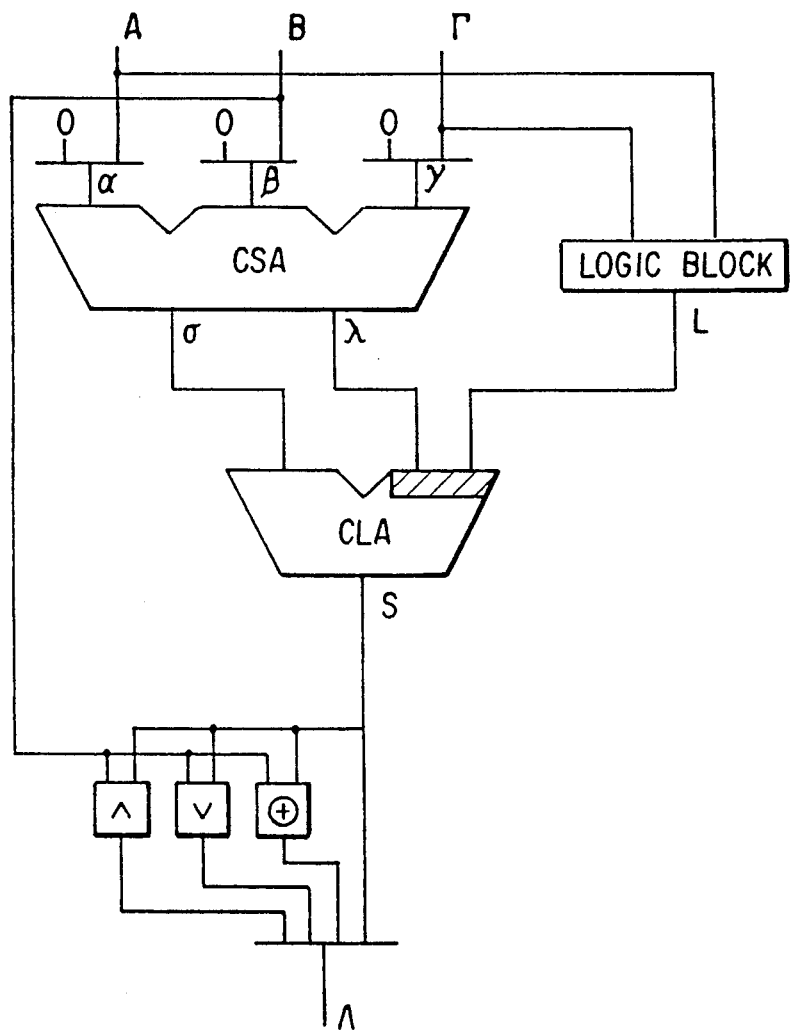
FIG. 5 illustrates Logical Datablow for interlock collapsing execution ALU with CSA carry and Logic block output selection embedded within the CLA.

In this section, the multiplexer shown before the CLA in FIG. 4 is avoided by executing the selection within the CLA. The carry from the CSA when logical ops are compounded with arithmetic ops and possess an interlock was considered in the previous section. The carry was found to be 0 for this condition due to the choice of inputs provided to the CSA. In the section called Minimization of Pre-Adder Logical Operations the output of the logical block was shown to be the appropriate logical function if the first instruction is a logical op and zero otherwise. Since the CSA carry and the logical output are zero when they are not desired for input to the CLA, the selection of the appropriate signal can be accomplished by ORing these two signals. This OR function can be embedded in the logic for computing generate and propagate signals within the CLA. Thus the ALU dataflow can be viewed as shown in FIG. 5 which illustrates logical dataflow for interlock collapsing execution ALU with CSA carry and Logic block output selection embedded within the CLA. In this figure, the carry from the CSA and the output of the logic function block are both provided as inputs to one side of the CLA. The first stage of the CLA is responsible for choosing between these two inputs as represented by the hashed block within the CLA in the figure.

The choice between the two inputs, $\lambda_{i+1}$ and $L_i$ can be made within the CLA by substituting $\lambda_{i+1} + L_i$ for $l_i$ in the CLA equations, where $l_i$ represents the normal input to the CLA and + is used to designate bitwise OR. Though this substitution causes the generates and propagates from the first stage to span fewer bits, the CLA can be implemented in an identical number of stages as a conventional CLA because the bookset is used more fully in subsequent stages. The sum for the most significant bit, the critical path of a CLA, can be generated in four stages as follows:

Stage 1

$$G_i^{*i+1} = \lambda_{i+1}\sigma_i + \lambda_{i+2}\sigma_{i+1} + L_i\sigma_i + L_{i+1}\sigma_{i+1} \quad i = 1,3,5,\ldots 29$$

$$T_i^{*i+1} = \overline{\lambda_{i+1}L_i\sigma_i} + \overline{\lambda_{i+2}L_{i+1}\sigma_{i+1}} \quad i = 2,4,6,\ldots 30$$

$$H_0 = \overline{\lambda}_1\overline{L}_0\sigma_0 + \lambda_1\overline{\sigma}_0 + L_0\overline{\sigma}_0$$

$$\phi_{31} = \lambda_{32}\sigma_{31} + L_{31}\sigma_{31} + \tau_1 \quad \tau_1 \text{ a hot one supplied to the ALU}$$

Stage 2

$$G_i^{*i+5} = G_i^{*i+1} + T_i^{i+2}G_{i+2}^{*i+3} + T_{i+1}^{i+2}T_{i+3}^{i+4}G_{i+4}^{*i+5} \quad i = 1,7,13,19$$

$$T_i^{i+5} = T_i^{i+1}T_{i+2}^{i+3}T_{i+4}^{i+5} \quad i = 2,8,14$$

$$M_0 = H_0 \vee T_1$$

$$\phi_{27}^{31} = G_{27}^{*28} + T_{28}^{29}G_{29}^{*30} + T_{28}^{29}T_{30}^{31}\phi_{31}$$

-continued

Stage 3

$$\overline{G_1^{*18}} = G_1^{*6} + T_2^7 G_7^{*12} + T_2^7 T_8^{13} G_{13}^{*18}$$

$$T_2^{19} = T_2^7 T_8^{13} T_{14}^{19}$$

$$\phi_{19}^{26} = G_{19}^{*24} + T_{20}^{25} G_{25}^{*26} + T_{20}^{25} T_{26}^{27} \phi_{27}^{31}$$

Stage 4

$$\overline{S_0} = M_0 G_1^{*18} + M_0 T_2^{19} \phi_{19}^{26} + H_0 \overline{G_1^{*18}} \overline{T_2^{17}} + H_0 \overline{G_1^{*18}} \overline{\phi_{19}^{26}}$$

Though not shown explicitly, the inversions that are shown above can be generated in the previous stage by using AOI's in addition to the AO's that are shown. The CLA implemented without embedding the selection in the front of the ALU would also require four stages according to the bookset assumed in Int. J. Elec., vol. 67, No. 2, supra.

Embedding Post-adder Logical Operations within the CLA

In previous sections, the design of the front end of the three-to-one ALU was presented. The front end has been designed so that the resulting sum for a conventional CLA would provide an addition of the three operands inputted to the ALU, an addition of two of the operands, a logical operation between two of the operands, or the addition of one of the operands with the results of a logical operation between two of the remaining operands. Thus, the use of a conventional CLA would provide the desired results for two of the instruction categories presented in the Background ALU Requirements section. Also given in that section was the expression for the ALU output, $\Lambda_i$, allowing the generation of the CLA sum, $S_i$, $S_i$ AND'd with a third operand, $S_i$ OR'd with a third operand, or $S_i$ XOR'd with a third operand in response to the control signals $\Xi_{ADD}$, $\Xi_{AND}$, $\Xi_{OR}$, and $\Xi_{XOR}$ which allows the generation of the final two categories. In this section, this expression is developed and combined with the expression for calculating the sum of the CLA, $S_i$. The results will be found to be analogous to that for generating $S_i$, thereby allowing the generation of the results to be embedded in the CLA. By embedding the generation of these results in the CLA, they can be produced in an equal number of stages that is required to produce the sum in a conventional CLA.

CLA Output Requirements to Support Logical Operations on the Sum

The expression for the desired output from the ALU, $\Lambda_i$, as given in the Background ALU Requirements sections, supra., is:

$$\Lambda_i = S_i \Xi_{ADD} + (S_i + B_i) \Xi_{OR} - (S_i B_i) \Xi_{AND} + (S_i \vee B_i) \Xi_{XOR}$$

where $S_i$ is the sum from the CLA used in the three-to-one addition.

Expanding the exclusive or into its canonic sum of products produces:

$$\Lambda_i = S_i \Xi_{ADD} + (S_i + B_i) \Xi_{OR} + (S_i B_i) \Xi_{AND}$$

$$+ (\overline{S_i} B_i + S_i \overline{B_i}) \Xi_{XOR}.$$

But the control signals and the operand $B_i$ are available as inputs to the ALU while the sum $S_i$ is available much later. Thus, collecting the control signals and the operand inputs results in:

$$\Lambda_i = S_i (\Xi_{ADD} + \Xi_{OR} + B_i \Xi_{AND} + \overline{B_i} \Xi_{XOR}) + \overline{S_i} B_i \Xi_{XOR} + B_i \Xi_{OR}.$$

The following signals can be generated during the first stage of the ALU since they rely only on its inputs:

$$\Xi_{GENi} = \Xi_{ADD} + \Xi_{OR} + B_i \Xi_{AND} + \overline{B_i} \Xi_{XOR}$$

$$\Xi_{SXMi} = B_i \Xi_{XOR}$$

$$\Xi_{SOMi} = B_i \Xi_{OR}.$$

Substituting these into the equation for the ALU output gives:

$$\Lambda_i = S_i \Xi_{GENi} + \overline{S_i} \Xi_{SXMi} + \Xi_{SOMi}.$$

To avoid an additional stage of delay in the ALU, the output $\Lambda_i$ needs to be generated as $S_i$ is being generated. Given that according to our assumed bookset that $$S_i = M_i \phi_{i+1} + H_i \overline{\phi_{i+1}}$$

where $M_i$ is the XOR of the half sum at i and the transmit at i+1, $H_i$ is the half sum at i, and $\phi_{i+1}$ is the new carry at bit position i+1, $\overline{S_i}$ becomes:

$$\overline{S_i} = \overline{M_i \phi_{i+1} + H_i \overline{\phi_{i+1}}}$$

$$\overline{S_i} = \overline{M_i \phi_{i+1}} \cdot \overline{H_i \overline{\phi_{i+1}}}$$

$$\overline{S_i} = (\overline{M_i} + \overline{\phi_{i+1}})(\overline{H_i} + \phi_{i+1})$$

$$\overline{S_i} = \overline{M_i} \phi_{i+1} + \overline{H_i} \overline{\phi_{i+1}}.$$

Substituting $S_i$ and $\overline{S_i}$ into the equation for $\Lambda_i$ gives:

$$\Lambda_i = (M_i \phi_{i+1} + H_i \overline{\phi_{i+1}}) \Xi_{GENi} + (\overline{M_i} \phi_{i+1} + \overline{H_i} \overline{\phi_{i+1}}) \Xi_{SXMi} + \Xi_{SOMi}$$

$$\Lambda_i = M_i \phi_{i+1} \Xi_{GENi} + H_i \overline{\phi_{i+1}} \Xi_{GENi} + \overline{M_i} \phi_{i+1} \Xi_{SXMi} + \overline{H_i} \overline{\phi_{i+1}} \Xi_{SXMi} + \Xi_{SOMi}$$

$$\Lambda_i = (M_i \Xi_{GENi} + \overline{M_i} \Xi_{SXMi}) \phi_{i+1} + (H_i \Xi_{GENi} + \overline{H_i} \Xi_{SXMi}) \overline{\phi_{i+1}} + \Xi_{SOMi}.$$

Let, $$\mu_i = M_i \Xi_{GENi} + \overline{M_i} \Xi_{SXMi}$$

and, $$\theta_i = H_i \Xi_{GENi} + \overline{H_i} \Xi_{SXMi}.$$

Then, $\Lambda_i$ can be expressed as $$\Lambda_i = \mu_i \phi_{i+1} + \theta_i \overline{\phi_{i+1}} + \Xi_{SOMi}.$$

The Critical Path of the Modified CLA

The expression for $\Lambda_i$, the output from the CLA modified to allow the execution of logical operations between the sum and a third operand, was generated in the previous section. In this section, the expressions for the new carry, pseudo-generate, and pseudo-transmit (pseudo-propagate) signals are used to further develop the expression for $\Lambda_0$, which constitutes the critical path of a 32 bit CLA so modified. As before, a bookset with a 3×4 AO is assumed.

The output of the modified CLA at the MSB position, $\Lambda_0$, is:

$$\Lambda_0 = \mu_0 \phi_1 + \theta_0 \overline{\phi_1} + \Xi_{SOM0}.$$

Given that the new carry, $\phi_1$, is according to our assumed bookset $$\phi_1 = G_1^{*n} + T_2^{n+1} \phi_{n+1}^z$$

where $0 < n < 31$ and $n < z < 31$ (Actual values for n and z will be presented later. For the present discussion, the use of n and z is sufficient.), $\Lambda_0$ can be expressed as:

$$\Lambda_0 = \mu_0(G_1^{*n} + T_2^{n+1}\phi_{n-1}^z) + \theta_0(\overline{G_1^{*n} + T_2^{n+1}\phi_{n+1}^z}) + \Xi_{SOM0}$$

$$\Lambda_0 = \mu_0 G_1^{*n} + \mu_0 T_2^{n+1}\phi_{n+1}^z + \theta_0 \overline{G_1^{*n}}\,\overline{T_2^{n+1}} + \theta_0 \overline{G_1^{*n}}\overline{\phi_{n+1}^z} + \Xi_{SOM0}$$

$$\Lambda_0 = \mu_0 G_1^{*n} + \Xi_{SOM0} + \mu_0 T_2^{n+1}\phi_{n+1}^z + \theta_0 \overline{G_1^{*n}}\overline{T_2^{n+1}} + \theta_0 \overline{G_1^{*n}}\overline{\phi_{n+1}^z}$$

$$\Lambda_0 = (\mu_0 + \Xi_{SOM0})(G_1^{*n} + \Xi_{SOM0}) + \mu_0 T_2^{n+1}\phi_{n+1}^z + \theta_0 \overline{G_1^{*n}}\overline{T_2^{n+1}} + \theta_0 \overline{G_1^{*n}}\overline{\phi_{n+1}^z}.$$

By defining $\mu_0^*$ as:

$$\mu_0^* = \mu_0 + \Xi_{SOM0},$$

$\Lambda_0$ can be expressed as:

$$\Lambda_0 = \mu_0^*(G_1^{*n} + \Xi_{SOM0}) + \mu_0 T_2^{n+1}\phi_{n+1}^z + \theta_0 \overline{G_1^{*n}}\overline{T_2^{n+1}} + \theta_0 \overline{G_1^{*n}}\overline{\phi_{n+1}^z}.$$

Furthermore, if $G_1^{+n}$ is defined as:

$$G_1^{+n} = G_1^{*n} + \Xi_{SOM0},$$

$\Lambda_0$ can be written as:

$$\Lambda_0 = \mu_0^* G_1^{+n} + \mu_0 T_2^{n+1}\phi_{n+1}^z + \theta_0 \overline{G_1^{*n}}\,\overline{T_2^{n+1}} + \theta_0 \overline{G_1^{*n}}\overline{\phi_{n+1}^z}.$$

This expression is analogous to the expression for generating the sum in a conventional CLA for the assumption of a 3×4 AO. For comparison, the expression for $S_0$ the MSB from a conventional CLA assuming a 3×4 bookset, according to the assumptions used, see Int. J. Elec vol. 67, No. 2, supra, is:

$$S_0 = M_0 G_1^{*n} + M_0 T_2^{n+1}\phi_{n+1}^z + H_0 \overline{G_1^{*n}}\,\overline{T_2^{n+1}} + H_0 \overline{G_1^{*n}}\overline{\phi_{n+1}^z}.$$

A comparison of these two expressions indicates that $\Lambda_0$ can be generated in the same number of stages as $S_0$ if the quantities $\mu_0$, $\mu_0^*$, $\theta_0$, and $G_1^{+n}$ can be generated in one less stage than is required to generate the sum, $S_0$.

Generation of CLA Parameters Unique to the Modified CLA

The parameters in the expression for $\Lambda_0$ that are distinct from those in the expression for $S_0$ were given in the previous two sections. These parameters along with their expressions are:

$$\mu_0 = M_0 \Xi_{GEN0} + \overline{M_0} \Xi_{SXM0}$$

$$\theta_0 = H_0 \Xi_{GEN0} + \overline{H_0} \Xi_{SXM0}$$

$$\mu_0^* = \mu_0 + \Xi_{SOM0}$$

$$G_1^{+n} = G_1^{*n} + \Xi_{SOM0}$$

Generation of the signals $\Xi_{GEN0}$, $\Xi_{SOM0}$, and $\Xi_{SXM0}$ was discussed in the previous section about the CLA Output Requirements to Support Logical Operations on the Sum, where they were found to be generated in the first stage of the ALU. Therefore, they are available to the modified CLA at the same time that the inputs to the CLA are available. $H_0$ can be generated in the second stage of the ALU, or first stage of the CLA by:

$$H_0 = (\lambda_1 + L_0) \vee \sigma_0$$

$$H_0 = (\overline{\lambda_1 + L_0})\sigma_0 + (\lambda_1 + L_0)\overline{\sigma_0}$$

$$H_0 = \overline{\lambda_1}\overline{L_0}\sigma_0 + \lambda_1 \overline{\sigma_0} + L_0\overline{\sigma_0},$$

while $\overline{H_0}$ can be calculated by:

$$\overline{H_0} = \overline{(\lambda_1 + L_0) \vee \sigma_0}$$

$$\overline{H_0} = (\lambda_1 + L_0)\sigma_0 + \overline{(\lambda_1 + L_0)}\overline{\sigma_0}$$

$$\overline{H_0} = \lambda_1 \sigma_0 + L_0 \sigma_0 + \overline{\lambda_1}\overline{L_0}\overline{\sigma_0}.$$

During the third stage of the ALU (second stage of the CLA), $M_0$, $\overline{M_0}$, $\theta_0$, and $\mu_0$ can be produced. The expressions for these are:

$$M_0 = H_0 \vee T_1$$

$$\overline{M_0} = \overline{H_0 \vee T_1}$$

$$\theta_0 = H_0 \Xi_{GEN0} + \overline{H_0} \Xi_{SXM0}$$

$$\mu_0 = M_0 \Xi_{GEN0} + \overline{M_0} \Xi_{SXM0} = H_0 \overline{T_1} \Xi_{GEN0} + \overline{H_0} T_1 \Xi_{GEN0} + H_0 T_1 \Xi_{SXM0} + \overline{H_0}\overline{T_1} \Xi_{SXM0}$$

The transmit signals, $T_1$ and $\overline{T_1}$, are generated during the second stage of the ALU (first stage of the CLA) as:

$$T_1 = \lambda_2 + L_1 + \sigma_1$$

$$\overline{T_1} = \overline{\lambda_2 + L_1 + \sigma_1}.$$

Figure 6:
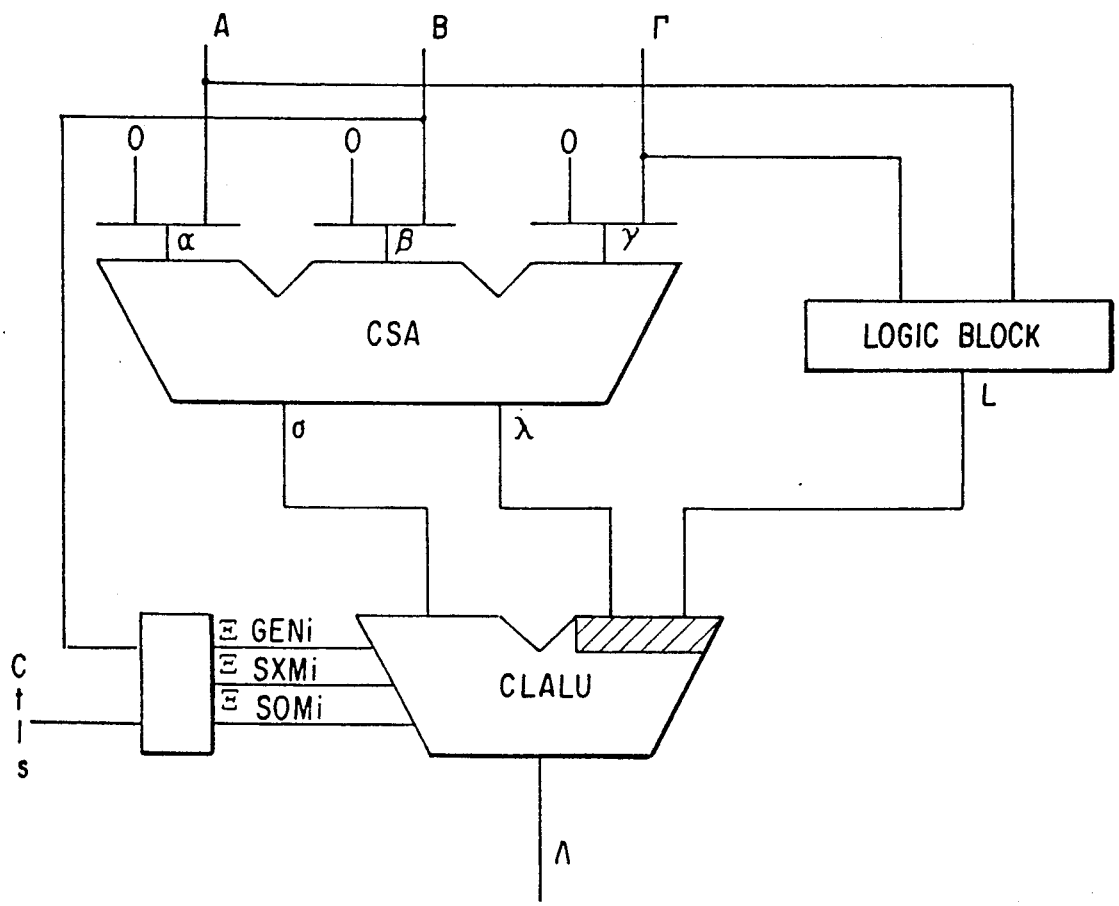
FIG. 6 illustrates Dataflow for fast implementation of interlock collapsing ALU-implementation 1.

In the fourth stage of the ALU (third stage of the CLA) $\mu_0^*$ and $G_1^{+n}$ can be calculated. The calculation of $\mu_0^*$ is made by:

$\mu_0^* = \mu_0 + \Xi_{SOM0}$.

in the section called Choosing Between the CSA Carry and the Logic Block Output, the pseudo-generate from 1 to 18, $G_1^{*18}$, was shown to be generated using a $3\times 3$ AO. Since $G_1^{+18}$ is:

$G_1^{+18} = G_1^{*18} + \Xi_{SOM0}$ $G_1^{+18}$ can be determined using a $3\times 4$ AO in this stage of the CLA. As a result, all of the literals required in the expression to generate $\Lambda_0$ are available at the end of the fourth stage of the ALU. The generation of $\Lambda_0$ can proceed in the fifth stage of the ALU which is the fourth stage of the CLA. This is the same number of stages that a conventional CLA would require to generate the sum, $S_0$, see Int. J. Elec. Vol. 67, No. 2, supra; therefore, logical operations between the sum of the CLA and a third operand can be generated without adding stages to generate the result. The dataflow for this ALU can be represented as shown in FIG. 6 which illustrates dataflow for fast implementation of interlock collapsing ALU - implementation 1.

Stage by State Description of Calculation of the ALU Output

Different aspects of the three-to-one ALU have been developed independently in the previous sections. In this section, the results of these developments are combined to present a stage by stage description of the ALU. First a description of the ALU is presented as generic expressions for each stage. Subsequently the stage by stage description for the critical path when executing each of the four functional categories is presented.

Generalized Stage by Stage ALU Description

In stage one of the ALU, pre-adder logic functions are performed on two of three input operands, or CSA adder operations are performed on up to three input operands. The expressions that are generated at each stage of the ALU are:

STAGE 1 (CSA)
$L_i = L_{li}\Omega_{OALASL} + L_{ri}\Omega_{OALASL} + L_{li}L_{ri}\Omega_{XAAL} + \overline{L_{li}L_{ri}}\Omega_{XOSL}$
$\overline{L_i} = L_{li}\Omega_{OALASL} + L_{ri}\Omega_{OALASL} + L_{li}L_{ri}\Omega_{XAAL} + \overline{L_{li}L_{ri}}\Omega_{XOSL}$
$\sigma_i = \alpha_i\overline{\beta_i}\overline{\gamma_i} + \overline{\alpha_i}\beta_i\overline{\gamma_i} + \overline{\alpha_i}\overline{\beta_i}\gamma_i + \alpha_i\beta_i\gamma_i$  $0 \leq i \leq 31$
$\overline{\sigma_i} = \alpha_i\overline{\beta_i}\overline{\gamma_i} + \overline{\alpha_i}\beta_i\overline{\gamma_i} + \overline{\alpha_i}\overline{\beta_i}\gamma_i + \alpha_i\beta_i\gamma_i$  $0 \leq i \leq 31$
$\lambda_i = \alpha_i\beta_i + \alpha_i\gamma_i + \beta_i\gamma_i$  $0 \leq i \leq 31$
$\overline{\lambda_i} = \overline{\alpha_i\beta_i + \alpha_i\gamma_i + \beta_i\gamma_i}$  $0 \leq i \leq 31$
$\lambda_i = \tau_2$  $i = 32$
$\Xi_{GENi} = \Xi_{ADD} + \Xi_{OR} + B_i\Xi_{AND} + \overline{B_i}\Xi_{XOR}$
$\Xi_{SXMi} = B_i\Xi_{XOR}$
$\Xi_{SOMi} = B_i\Xi_{OR}$ STAGE 2 (CLA)
$G_i^{*i+1} = \lambda_{i+1}\sigma_i + \lambda_{i+2}\sigma_{i+1} +$  $i = 1, 3, 5, \ldots 29$
$\quad L_i\sigma_i + L_{i+1}\sigma_{i+1}$
$T_i^{i+1} = \overline{\lambda_{i+1}L_i\sigma_i + \lambda_{i+2}L_{i+1}\sigma_{i+1}}$  $i = 2, 4, 6, \ldots 30$
$T_1 = \lambda_2 + L_1 + \sigma_1$
$H_0 = \overline{\lambda_1 L_0\sigma_0} + \lambda_1\overline{\sigma_0} + L_0\overline{\sigma_0}$
$\overline{H_0} = \overline{\lambda_1 L_0\sigma_0} + \lambda_1\sigma_0 + L_0\sigma_0$ $\phi_{31} = \lambda_{32}\sigma_{31} + L_{31}\sigma_{31} + \tau_1$ STAGE 3 (CLA)
$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5} =$ 1,7,13,19
$T_i^{i+5} = T_i^{i+1}T_{i+2}^{i+3}T_{i+4}^{i+5}$  $i = 2,8,14$
$M_0 = H_0\forall T_1$
$\overline{M_0} = \overline{M_0\forall T_1}$
$\theta_0 = H_0\Xi_{GEN0} + \overline{H_0}\Xi_{SXM0}$
$\mu_0 = H_0T_1\Xi_{GEN0} + \overline{H_0}T_1\Xi_{GEN0} + H_0\overline{T_1}\Xi_{SXM0} + \overline{H_0T_1}\Xi_{SXM0}$
$\phi_{27}^{31} = G_{27}^{28} + T_{28}^{29}G_{29}^{30} + T_{28}^{31}T_{30}^{31}\phi_{31}$ STAGE 4 (CLA)
$G_1^{*18} = G_1^{*6} + T_2^7G_7^{*12} + T_2^7T_8^{13}G_{13}^{*18}$
$G_1^{+18} = G_1^{*6} + T_2^7G_7^{*12} + T_2^7T_8^{13}G_{13}^{*18} + \Xi_{SOM0}$
$T_2^{19} = T_2^7T_8^{13}T_{14}^{19}$
$\mu_0^* = \mu_0 + \Xi_{SOM0}$
$\phi_{19}^{26} = G_{19}^{*24} + T_{20}^{25}G_{25}^{*26} + T_{20}^{25}T_{26}^{27}\phi_{27}^{31}$ STAGE 5 (CLA)
$\Lambda_0 = \mu_0^*G_1^{+18} + \mu_0T_2^{19}\phi_{19}^{26} + \theta_0\overline{G_1^{*18}}\overline{T_2^{19}} + \theta_0\overline{G_1^{*18}}\overline{\phi_{19}^{26}}$.

Stage by Stage Description for Generating $A+B+\Gamma$

To generate this function, the signals controlling the front end of the ALU are:

$\Omega_{OALASL} = 0$ $\Omega_{XAAL} = 0$ $\Omega_{XOSL} = 0$

The signals controlling the CLA are:

$\Xi_{ADD} = 1$ $\Xi_{OR} = 0$ $\Xi_{AND} = 0$ $\Xi_{XOR} = 0$.

With the controls set as given above each multiplexer controlling an input to the CSA is set to pass the ALU input to the corresponding CSA input. The logic function block outputs 0. In addition, the CLA is set to perform a conventional two-to-one add. The results along the critical path are given below.

STAGE 1
$L_i = 0$
$\sigma_i = \alpha_i\overline{\beta_i}\overline{\gamma_i} + \overline{\alpha_i}\beta_i\overline{\gamma_i} + \overline{\alpha_i}\overline{\beta_i}\gamma_i + \alpha_i\beta_i\gamma_i$  $0 \leq i \leq 31$
$\lambda_i = \alpha_i\beta_i + \alpha_i\gamma_i + \beta_i\gamma_i$  $0 \leq i \leq 31$
$\lambda_i = \tau_2$  $i = 32$
$\Xi_{GENi} = 1$
$\Xi_{SXMi} = 0$
$\Xi_{SOMi} = 0$ STAGE 2
$G_i^{*i+1} = \lambda_{i+1}\sigma_i + \lambda_{i+2}\sigma_{i+1}$  $i = 1, 3, 5, \ldots 29$
$T_i^{i+1} = \overline{\lambda_{i+1}\sigma_i + \lambda_{i+2}\sigma_{i+1}}$  $i = 2, 4, 6, \ldots 30$
$T_1 = \lambda_2 + \sigma_1$
$H_0 = \overline{\lambda_1}\overline{\sigma_0} + \lambda_1\overline{\sigma_0}$
$\overline{H_0} = \overline{\lambda_1}\sigma_0 + \lambda_1\sigma_0$
$\phi_{31} = \lambda_{32}\sigma_{31} + \tau_1$

STAGE 3

-continued $$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}\ i = 1, 7, 13, 19$$

$$T_i^{i+5} = T_i^{i+1}T_{i+2}^{i+3}T_{i+4}^{i+5} \qquad i = 2, 8, 14$$

$M_0 = H_0 \triangledown T_1$
$\overline{M_0} = \overline{H_0 \triangledown T_1}$
$\theta_0 = H_0$
$\mu_0^* = H_0\overline{T_1} + \overline{H_0}T_1 = M_0$
$\phi_{27}^{31} = G_{27}^{*28} + T_{28}^{29}G_{29}^{*30} + T_{28}^{29}T_{30}^{31}\phi_{31}$ STAGE 4
$G_1^{*18} = G_1^{*6} + T_2^7G_7^{*12} + T_2^7T_8^{13}G_{13}^{*18}$
$\overline{G_1^{+18}} = \overline{G_1^{*6} + T_2^7G_7^{*12} + T_2^7T_8^{13}G_{13}^{*18}} = \overline{G_1^{*18}}$
$\mu_0^* = M_0$
$\phi_{19}^{26} = G_{19}^{*24} + T_{20}^{25}G_{25}^{*26} + T_{20}^{25}T_{26}^{27}\phi_{27}^{31}$ STAGE 5
$\Lambda_0 = \mu_0^*G_1^{+18} + \mu_0T_2^{19}\phi_{19}^{26} + \theta_0\overline{G_1^{*18}}\overline{T_2^{19}} + \theta_0\overline{G_1^{*18}}\overline{\phi_{19}^{26}}$ Substituting the expressions for $\mu_0$, $\mu_0^*$, $\theta_0$, and $G_1^{+18}$, the output expression becomes:

$$\Lambda_0 = M_0G_1^{*18}M_0T_2^{19}\phi_{19}^{26} + H_0\overline{G_1^{*18}}T_2^{19} + H_0\overline{G_1^{*18}}\overline{\phi_{19}^{26}}$$

the expression for the conventional sum from the CLA. Since the sum and carry from the CSA are utilized in producing the results from the CLA, and the CSA executes a three-to-two addition, the ALU produces a three-to-one addition on the three operands A, B and Γ.

Stage by Stage Description for Generating B+(ALOP Γ)

To generate this function, one of the signals specifying a logical operation at the front end of the ALU is a one. The ALU inputs corresponding to $\alpha_i$ and $\gamma_i$ are zeroed at the corresponding inputs to the CSA while the ALU input corresponding to $\beta_i$ is provided to the CSA. The backend controls are set identically to that for A+B+Γ. With the controls set in this manner the results along the critical path are:

STAGE 1
$L_i = A_i \text{LOP } \Gamma_i$
$\sigma_i = \beta_i = B_i \qquad 0 \leq i \leq 31,$
$\lambda_i = 0 \qquad 0 \leq i \leq 31$
$\lambda_i = \tau_2 = 0 \qquad i = 32$
$\Xi_{GENi} = 1$
$\Xi_{SXMi} = 0$
$\Xi_{SOMi} = 0$ STAGE 2
$G_i^{*i+1} = L_iB_i + L_{i+1}B_{i+1}\ i = 1, 3, 5, \ldots 29$ $T_i^{i+1} = \overline{L_iB_i} + \overline{L_{i+1}B_{i+1}}\ i = 2, 4, 6, \ldots 30$ $T_1 = L_1 + B_1$
$H_0 = L_0B_0 + L_0\overline{B_0}$
$\overline{H_0} = \overline{L_0B_0} + L_0\overline{B_0}$
$\phi_{31} = L_{31}B_{31} + \tau_1$ STAGE 3
$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}\ i = 1, 7, 13, 19$ $T_i^{i+5} = T_i^{i+1}T_{i+2}^{i+3}T_{i+4}^{i+5} \qquad i = 2, 8, 14$ $M_0 = H_0 \triangledown T_1$
$\overline{M_0} = \overline{H_0 \triangledown T_1}$
$\theta_0 = H_0$
$\mu_0^* = H_0\overline{T_1} + \overline{H_0}T_1 = M_0$
$\phi_{27}^{31} = G_{27}^{*28} + T_{28}^{29}G_{29}^{*30} + T_{28}^{29}T_{30}^{31}\phi_{31}$

STAGE 4

-continued
$G_1^{*18} = G_1^{*6} + T_2^7G_7^{*12} + T_2^7T_8^{13}G_{13}^{*18}$
$\overline{G_1^{+18}} = \overline{G_1^{*6} + T_2^7G_7^{*12} + T_2^7T_8^{13}G_{13}^{*18}} = \overline{G_1^{*18}}$
$\mu_0^* = M_0$
$\phi_{19}^{26} = G_{19}^{*24} + T_{20}^{25}G_{25}^{*26} + T_{20}^{25}T_{26}^{27}\phi_{27}^{31}$ STAGE 5
$\Lambda_0 = \mu_0^*G_1^{+18} + \mu_0T_2^{19}\phi_{19}^{26} + \theta_0\overline{G_1^{*18}}\overline{T_2^{19}} + \theta_0\overline{G_1^{*18}}\overline{\phi_{19}^{26}}$ As for the case A+B+Γ, substitution of $\mu_0$, $\mu_0^*$, $\theta_0$, and $G_1+^{18}$ results in a conventional sum produced in the CLA. In this case, however, the sum from the CSA and the logic function block output are used within the CLA to produce the results. Since the output from the logic function block L is (A LOP Γ), the function that is executed is the addition of B to the logical operation performed on A and Γ as desired, i.e. B+(A LOP Γ).

Stage by Stage Description for Generating BLOP (A+Γ)

For this function to be generated, the control signals for the front end of the ALU indicate that a logical operation is not be produced. In addition, the multiplexer controlling the input of the CSA at $\beta_i$ is set to force $\beta_i$ to zero. As a result, the sum and carry from the CSA are appropriate for generating the two operand addition A+Γ from a conventional CLA. The CLA controls, however, are set to indicate the appropriate logical operation to perform on the two to one addition. The example in which the middle operand is to be exclusive-ORed with A+Γ is provided below.

STAGE 1
$L_i = 0$
$\sigma_i = \alpha_i\overline{\gamma_i} + \overline{\alpha_i}\gamma_i \qquad 0 \leq i \leq 31,$
$\lambda_i = \alpha_i\gamma_i \qquad 0 \leq i \leq = 31$
$\lambda_i = \tau_2 = 0 \qquad i = 32$
$\Xi_{GENi} = \overline{B_i}$
$\Xi_{SXMi} = B_i$
$\Xi_{SOMi} = 0$ STAGE 2
$G_i^{*i+1} = \lambda_{i+1}\sigma_i + \lambda_{i+2}\sigma_{i+1}\ i = 1, 3, 5, \ldots 29$ $T_i^{i+1} = \overline{\lambda_{i+1}\sigma_i} + \overline{\lambda_{i+2}\sigma_{i+1}}\ i = 2, 4, 6, \ldots 30$ $T_1 = \lambda_2 + \sigma_1$
$H_0 = \overline{\lambda_1}\sigma_0 + \lambda_1\overline{\sigma_0}$
$\overline{H_0} = \overline{\lambda_1}\overline{\sigma_0} + \lambda_1\sigma_0$
$\phi_{31} = \lambda_{32}\sigma_{31} + \tau_1$ STAGE 3
$G_i^{*i+5} = G_i^{*i+1} + T_{i+1}^{i+2}G_{i+2}^{*i+3} + T_{i+1}^{i+2}T_{i+3}^{i+4}G_{i+4}^{*i+5}\ i = 1, 7, 13, 19$ $T_i^{i+5} = T_i^{i+1}T_{i+2}^{i+3}T_{i+4}^{i+5} \qquad i = 2, 8, 14$ $M_0 = H_0 \triangledown T_1$
$\overline{M_0} = \overline{H_0 \triangledown T_1}$
$\theta_0 = H_0\overline{B_0} + \overline{H_0}B_0$
$\mu_0^* = H_0\overline{T_1}\overline{B_0} + \overline{H_0}T_1\overline{B_0} + H_0T_1B_0 + \overline{H_0}\overline{T_1}B_0 = \overline{M_0}B_0 + M_0\overline{B_0}$
$\phi_{27}^{31} = G_{27}^{*28} + T_{28}^{29}G_{29}^{*30} + T_{28}^{29}T_{30}^{31}\phi_{31}$ STAGE 4
$G_1^{*18} = G_1^{*6} + T_2^7G_7^{*12} + T_2^7T_8^{13}G_{13}^{*18}$
$\overline{G_1^{+18}} = \overline{G_1^{*6} + T_2^7G_7^{*12} + T_2^7T_8^{13}G_{13}^{*18}} = \overline{G_1^{*18}}$
$T_2^{19} = T_2^7T_8^{13}T_{14}^{19}$
$\mu_0^* = M_0\overline{B_0} + \overline{M_0}B_0$
$\phi_{19}^{26} = G_{19}^{*24} + T_{20}^{25}G_{25}^{*26} + T_{20}^{25}T_{26}^{27}\phi_{27}^{31}$ STAGE 5
$\Lambda_0 = \mu_0^*G_1^{+18} + \mu_0T_2^{19}\phi_{19}^{26} + \theta_0\overline{G_1^{*18}}\overline{T_2^{19}} + \theta_0\overline{G_1^{*18}}\overline{\phi_{19}^{26}}$ Subtituting $\mu_0$, $\mu_0^*$, $\theta_0$, and $G_1^{+18}$ into the expression for $\Lambda_0$ produced:

$$\Lambda_0 = (M_0\overline{B_0} + \overline{M_0}B_0)G_1^{*18} + (M_0\overline{B_0} + \overline{M_0}B_0)T_2^{19}\phi_{19}^{26}$$
$$+ (\overline{H_0}\overline{B_0} + \overline{H_0}B_0)\overline{G_1^{*18}T_2^{19}} + (\overline{H_0}\overline{B_0} + \overline{H_0}B_0)\overline{G_1^{*18}}\phi_{19}^{26}.$$

$$\Lambda_0 = M_0\overline{B_0}G_1^{*18} + \overline{M_0}B_0G_1^{*18} + M_0\overline{B_0}T_2^{19}\phi_{19}^{26} + \overline{M_0}B_0T_2^{19}\phi_{19}^{26} +$$
$$\overline{H_0}\overline{B_0}\overline{G_1^{*18}T_2^{19}} + \overline{H_0}B_0\overline{G_1^{*18}T_2^{19}} + \overline{H_0}\overline{B_0}\overline{G_1^{*18}}\phi_{19}^{26} + \overline{H_0}B_0\overline{G_1^{*18}}\phi_{19}^{26}$$

$$\Lambda_0 = (M_0G_1^{*18} + M_0T_2^{19}\phi_{19}^{26} + \overline{H_0}\overline{G_1^{*18}T_2^{19}}$$
$$+ \overline{H_0}\overline{G_1^{*18}}\phi_{19}^{26})\overline{B_0}$$
$$+ (\overline{M_0}G_1^{*18} + \overline{M_0}T_2^{19}\phi_{19}^{26} + \overline{H_0}\overline{G_1^{*18}T_2^{19}}$$
$$+ \overline{H_0}\overline{G_1^{*18}}\phi_{19}^{26})B_0.$$

Since the first term in parentheses is the conventional sum from a CLA, the above expression represents the EXCLUSIVE-OR between the sum and B if and only if the second parenthetical expression is equal $S_0$. Given that $S_0$ is:

$$\overline{S_0} = \overline{M_0\phi_1^{18}} + \overline{H_0\phi_1^{18}}$$

and applying DeMorgan's Theorem givens:

$$\overline{S_0} = (\overline{M_0\phi_1^{19}})(\overline{H_0\phi_1^{18}})$$

$$\overline{S_0} = (\overline{M_0} + \overline{\phi_1^{18}})(\overline{H_0} + \phi_1^{18})$$

$$\overline{S_0} = \overline{M_0}\overline{H_0} + \overline{M_0}\phi_1^{18} + \overline{H_0}\overline{\phi_1^{18}}$$

$$\overline{S_0} = \overline{M_0}\overline{H_0}\phi_1^{18} + \overline{M_0}\overline{H_0\phi_1^{18}} + \overline{M_0}\phi_1^{18} + \overline{H_0}\ \overline{\phi_1^{18}}$$

$$\overline{S_0} = \overline{M_0}\phi_1^{18} + \overline{H_0\phi_1^{18}}.$$

Substituting the expression for $\phi_1^{18}$.

$$\phi_1^{18} = G_1^{*18} + T_2^{19}\phi_{19}^{26}$$

into this expression for $\overline{S_0}$ gives:

$$\overline{S_0} = \overline{M_0}G_1^{*18} + \overline{M_0}T_2^{19}\phi_{19}^{26} + \overline{H_0}\overline{G_1^{*18}T_2^{19}}$$
$$+ \overline{H_0}\overline{G_1^{*18}}\phi_{19}^{26}$$

Thus the expression for $\overline{S_0}$ is identical to the last term in parenthesis in the expression for $\Lambda_0$. The expression for the ALU output, therefore, reduces to:

$$\Lambda = S_0\overline{B_0} + \overline{S_0}B_0 = S_0 \forall B_0,$$

the exclusive or between the CLA sum and the operand B. But the inputs to the CLA were set to produce the sum between A and Γ. Therefore, the ALU produces the desired result:

$$\Lambda = B \forall (A + \Gamma)$$

where + indicates the arithmetic sum between A and Γ.

Dataflows of Implementations Controlling CSA Inputs

The three-to-one ALU has been shown in earlier sections to be implementable in five stages once the appropriate inputs are applied to the CSA. In this section, two implementations that apply the appropriate inputs to the CSA in difference manners are presented. In one of these implementations, the inputs to the CSA are controlled by a two-to-one multiplexer in front of the CSA. This implementation is useful in a technology where the two-to-one multiplexer adds a negligible delay in the path. In the second implementation six separately controlled inputs are applied to the CSA. Three of these inputs are supplied to the CSA, two to the pre-CLA logic function block, and one to the CLA controls. The six inputs are determined during decode of the operation to be performed by the ALU and are latched in six registers preceding the ALU. In this manner, the two-to-one multiplexer is removed from the ALU's critical path. The dataflows for these implementations are shown in FIG. 6 and FIG. 7, respectively.

Figure 7:
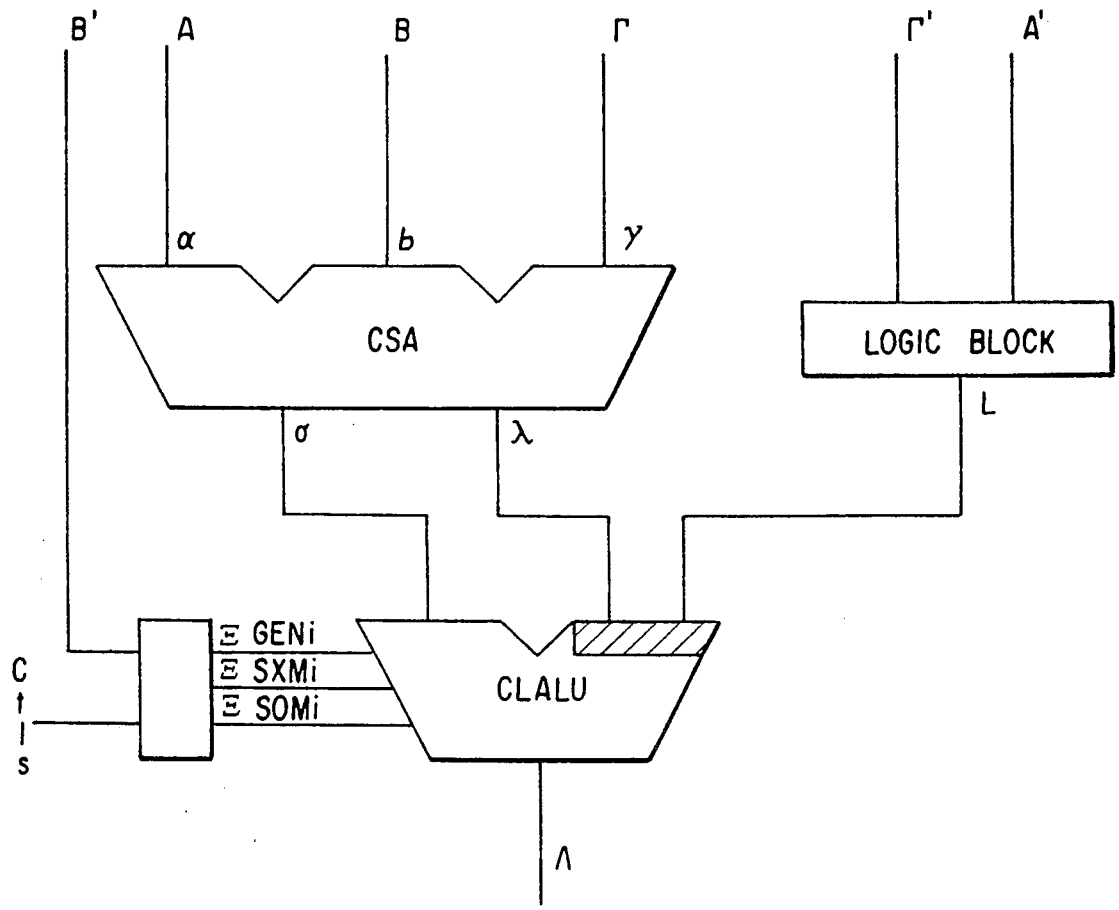
FIG. 7 illustrates Dataflow for fast implementation of interlock collapsing ALU-implementation 2.

FIG. 7 illustrates dataflow for fast implementation of interlock collapsing ALU - implementation 2.

IMPLEMENTATION CONTROLLING OUTPUT OF CSA WITHIN THE CSA

Many of the concepts developed in the section about Implementations Controlling Input to the CSA supra are applicable to the implementation of the ALU when the outputs of the CSA are controlled within the CSA itself. Those concepts that are applicable will not be revisited here. However, the requirements that change for the current implementation will be addressed. These changes will be found to occur in the front end of the ALU where the pre-CLA logic functions, the CSA outputs, and the selection between one CSA output and the logic function block are preformed.

Controlling the CSA Outputs

To reduce the critical path of the ALU, the outputs of the CSA must be controlled so that its outputs along with that of the pre-CLA logic block provide the inputs required to the CLA. In the earlier implementations, the carry from the CSA was paired with the output of the pre-CLA logic block to provide one input to the CLA with the other input coming from the sum from the CSA. The calculation of the sum from the CSA, however, requires a full 3×4 AO whereas the carry from the CSA requires only a 2×3 AO. This underutilization of the bookset allows the opportunity to control the inputs to the CLA within the CSA and the logic function block.

The input requirements to the CLA were given in Table 1. Obviously, the inputs to the CLA for the three-to-one addition must come from the two outputs of the CSA. In addition to these outputs, B, A∀T, 0, ALOPΓ, and AΓ are required to support the remaining functional categories. B, 0, and AΓ can be generated from $\lambda_i$ as follows. Let $\lambda_i$ be implemented as:

$$\lambda_i = \alpha_i\beta_i\Omega_1 + \alpha_i\gamma_i\Omega_2 + \beta_i\gamma_i\Omega_1$$
$$+ \beta_{i-1}\Omega_3.$$

where $\Omega_1$, $\Omega_2$, and $\Omega_3$ are control signals supplied to the ALU. When $\Omega_1 = \Omega_2 = \Omega_3 = 0$, all terms of the expression are zero so that $\lambda_i$ is zero. This produces one of the CLA inputs required to execute category four. When $\Omega_1 = \Omega_3 = 0$ and $\Omega_2 = 1$, then $\lambda_1 = \alpha_i\gamma_i$. This represents the carry produced from bit position i by the CSA. Since $\lambda_i$ is shifted left one bit position when supplied to the CLA, one of the CLA inputs required for executing category three is obtained. When $\Omega_1 = \Omega_2 = 1$ and $\Omega_3=0$, the result is $\lambda_i=\alpha_i\beta_i+\alpha_i\gamma_i+\beta_i\gamma_i$ which is the carry produced by the CSA for executing category one. Finally, when $\Omega_1=\Omega_2=0$ and $\Omega_3=1$, then $\lambda_i=\beta_{i-1}$. This produces the output B desired for the execution of the second category, B+(ALOPΓ). For this case, however, $\beta_i$ needs to be input to the CLA at bit position i. Now consider bit position j at the CLA. $\lambda_{i+1}$ is provided to the CLA at this bit position. Given that $\lambda_j=\beta_{i-1}$, $\gamma_{j+1}=\beta_{j+1-1}=\beta_j$. Therefore, the input to the CLA at bit position j is $\beta_j$ as desired for executing category two. From the above discussion, it can be seen that the carry from the CSA always produces a desirable input to the CLA for all four functional categories that must be supported by the ALU. For this reason, the carry by itself provides one input to the CLA.

Since the sum from the CSA fully utilizes the bookset, it can provide the second input to the CLA only for the first functional category in which a three-to-one addition is required. However, the logic function block, can be used to produce the inputs, $A_i$LOP $\Gamma_i$ and A∀Γ, required at the second input of the CLA for the remaining categories. Therefore, the second input of the CLA can be derived by selecting either $\sigma_i$ or $L_i$.

The logic block, however, can not be used as defined for the earlier implementations because that definition in conjunction with the above expression for $\lambda_i$ does not allow the production of A∀$\Gamma_i$ within the logic block while the CSA carry is producing $A_i\Gamma_i$. This is true because the polarities required for the operands by the logic block and the CSA carry to produce these results are inconsistent. This input inconsistency can be corrected, however, by changing the expression for the logic function to:

$$L_i=L_{li}\Omega_{OALASL}+L_{ri}\Omega_{OALASL}+\overline{L_{li}}L_{ri}\Omega_{XAAL}+\cdot L_{li}\overline{L_{ri}}\Omega_{XAAL}.$$

In this expression, the names for the control signals have been retained from the previous definition since each term is used as before to generate logical functions. However, the controls to specify XOR between $A_i$ and $\Gamma_i$ must also be active when the CLA is desired to produce A+Γ. The new input polarities required for this logic block definition are given in the input specification set forth for Table 4.

TABLE 4

Third Implementation ALU Input
Specification to Reduce Logical Function

| Active Controls | A | Γ |
|---|---|---|
| $\Omega_{AND}, \overline{\Omega_l}$ | T | ¬ |
| $\Omega_{OR}, \overline{\Omega_L}$ | T | T |
| $\Omega_{XOR}, \overline{\Omega_l}$ | T | T |
| $\Omega_{AND}, \Omega_l$ | ¬ | ¬ |
| $\Omega_{OR}, \Omega_l$ | T | ¬ |
| $\Omega_{XOR}, \Omega_l$ | T | ¬ |

One final hurdle must be overcome for this implementation to produce the desired result. In the previous implementations the carry from the CSA and the output from the logic function block were zero when their outputs were not desired as input to the CLA. This allowed the selection of the appropriate input to be implemented with a simple bitwise OR function. In this case, the output from the logic block is paired with the sum. The sum, however, is not zero when this input is undesired. The selection between the sum and the output of the logic block, therefore, is not a simple OR function between the sum and logic function block output but rather:

$$\sigma_i\Omega_4+L_i$$

where $\psi_4$ is another control signal to the ALU. This difference impacts the first stage of the CLA in which the selection between these possible inputs is made.

Embedding the Selection Between Sum and Logic Block Output in CLA

The selection between the sum and the output of the logic block is similar to the previous implementations with the exception that $\sigma_i\Omega_4+L_i$ is substituted for $I_i$ as an input to the CLA. With this substitution, the pseudo-generate from i to i+1 generated in the first stage of the CLA is:

$$G_i^{*i}=(\sigma_i\Omega_4+L_i)\lambda_{i+1}+(\sigma_{i+1}\Omega_4+L_{i+1})\lambda_{i+2}$$

$$G_i^{*1}=\sigma_i\Omega_4\lambda_{i+1}+L_i\lambda_{i+1}+\lambda_{i+1}\Omega_4\lambda_{i+2}+L_{i+1}\lambda_{i+2}.$$

The half sum, $H_i$ becomes:

$$H_0=(\sigma_i\Omega_4+L_i)\forall\lambda_{i+1}$$

$$H_0=\overline{(\sigma_i\Omega_4+L_i)}\lambda_{i+1}+(\sigma_i\Omega_4+L_i)\overline{\lambda_{i+1}}$$

$$H_0=\overline{\sigma_i\Omega_4L_i}\lambda_{i+1}+\sigma_1\Omega_4\overline{\lambda_{i+1}}L_1\overline{\lambda_{i+1}}$$

$$H_0=(\overline{\sigma_i}+\overline{\Omega_4})\overline{L_i}\lambda_{i+1}+\sigma_i\Omega_4\overline{\lambda_{i+1}}+L_i\overline{\lambda_{i+1}}$$

$$H_0=\overline{\sigma_iL_i}\lambda_{i+1}+\overline{\Omega_4L_i}\lambda_{i+1}+\sigma_i\Omega_4\overline{\lambda_{i+1}}L_i\overline{\lambda_{i+1}}.$$

The new carry is:

$$\phi_{31}=(\sigma_{31}\Omega_4+L_{31})\lambda_{32}+\tau_1$$

$$\phi_{31}=\sigma_{31}\Omega_4\lambda_{32}+L_{31}\lambda_{32}+\tau_1.$$

Finally, the pseudo-transmit from i to i+1 can ben generated as:

$$T_i^{i+1}=(\sigma_i\Omega_4+L_i+\lambda_{i+1})(\sigma_{i+1}\Omega_4+L_{i+1}+\lambda_{i+2})$$

$$T_i^{i+1}=\overline{(\sigma_i\Omega_4+L_i+\mu_{i+1})(\sigma_{i+1}\Omega_4+L_{i+1}+\mu_{i+2})}$$

$$T_i^{i+1}=\overline{(\sigma_i\Omega_4+L_i\mu_{i+1})+(\sigma_{i+1}\Omega_4+L_{i+1}\lambda_{i+2})}$$

$$T_i^{i+1}=\overline{\sigma_i\Omega_4L_i\lambda_{i+1}+\sigma_{i+1}\Omega_4L_{i+1}\lambda_{i+2}}$$

$$T_i^{i+1}=\overline{(\overline{\sigma_i}+\overline{\Omega_4})\overline{L_i}\lambda_{i+1}+(\overline{\sigma_{i+1}}+\overline{\Omega_4})\overline{L_{i+1}}\lambda_{i+2}}$$

$$T_i^{i+1}=\overline{\overline{\sigma_1L_i}\lambda_{i+1}+\overline{\Omega_4L_i}\lambda_{i+1}+\overline{\sigma_{i+1}L_{i+1}}}$$
$$\overline{\lambda_{i+2}+\overline{\Omega_4L_{i+1}}\lambda_{i+2}}.$$

Thus, $T_i^{i+1}$ can be implemented with a 3×4 AOI. Since identical values are implementable in the first stage of this implementation as in the previous two, the backend of the ALU in which the Post-CLA logic function are embedded into the CLA is identical to that in earlier implementations.

Dataflow of Implementation Controlling CSA Outputs within the CSA

Figure 8:
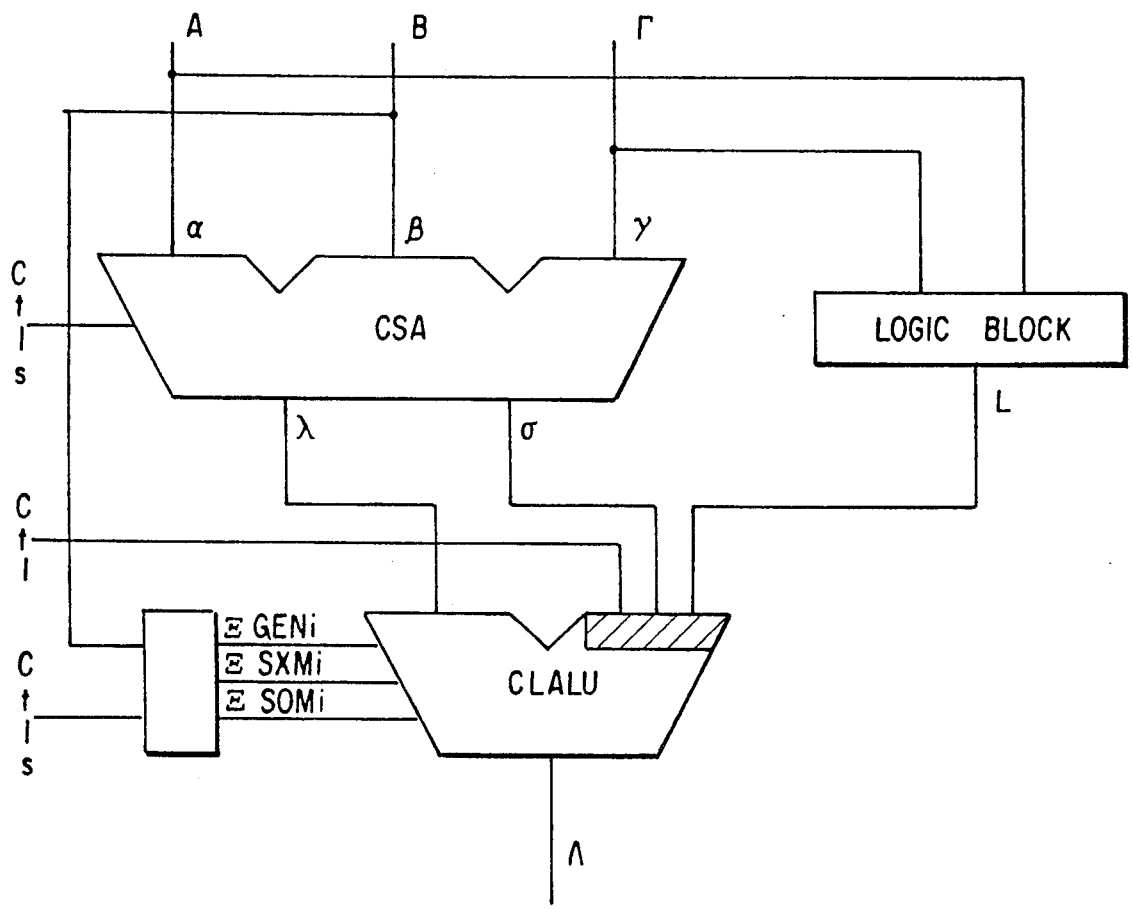
FIG. 8 illustrates Dataflow for fast implementation of interlock collapsing ALU-implementation 3.

The dataflow of the current implementation 3 is shown in FIG. 8 which illustrates the dataflow for fast implementation of interlock collapsing ALU-implementation 3. The multiplexer preceding the CSA is gone reducing the stages in the critical path without required an additional three registers before the ALU. The controls for the implementation are a little more complicated for this case, however. First, an additional control signal is required to aid the selection between the sum from the CSA and the output of the logic block. In addition, the decodes for the controls of the logic function block are more complicated since the EXCLUSIVE-OR must be generated when the instruction sequence consists of an interlocked arithmetic followed by a logical in addition to when the first instruction is a logical.

Implementations Allowing Parallel Determination of Condition Codes

Figure 9:
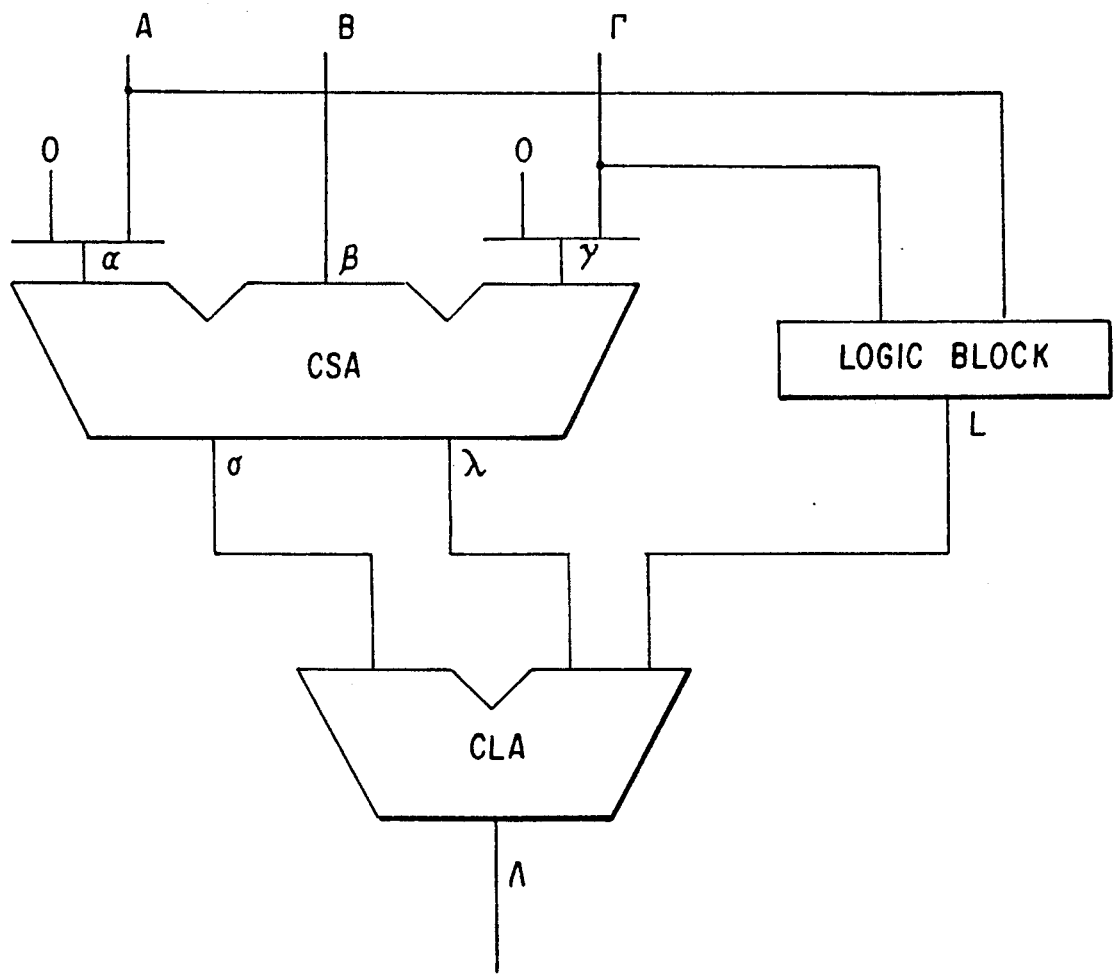
FIG. 9 illustrates Dataflow for fast implementation of interlock collapsing ALU-implementation 1 not supporting post adder logic operations.
Figure 10:
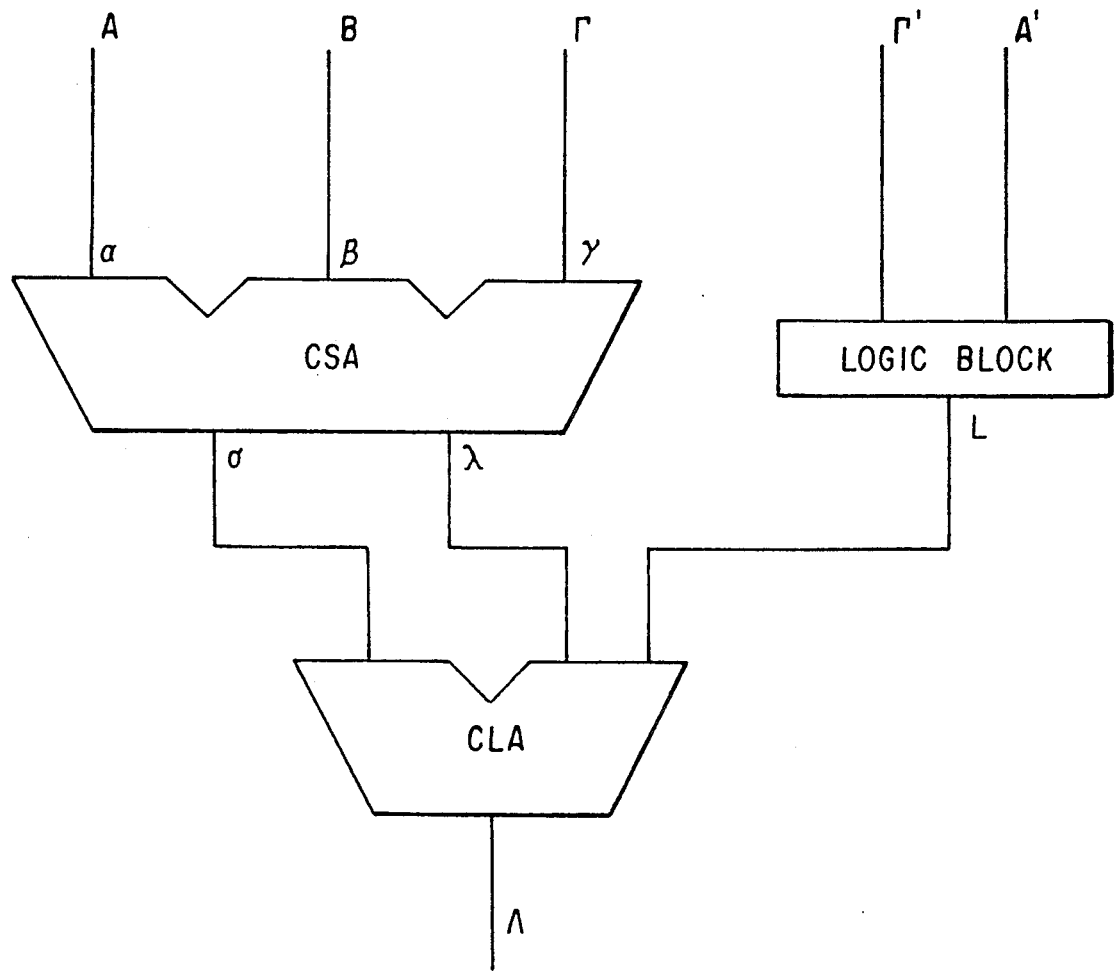
Figure 11:
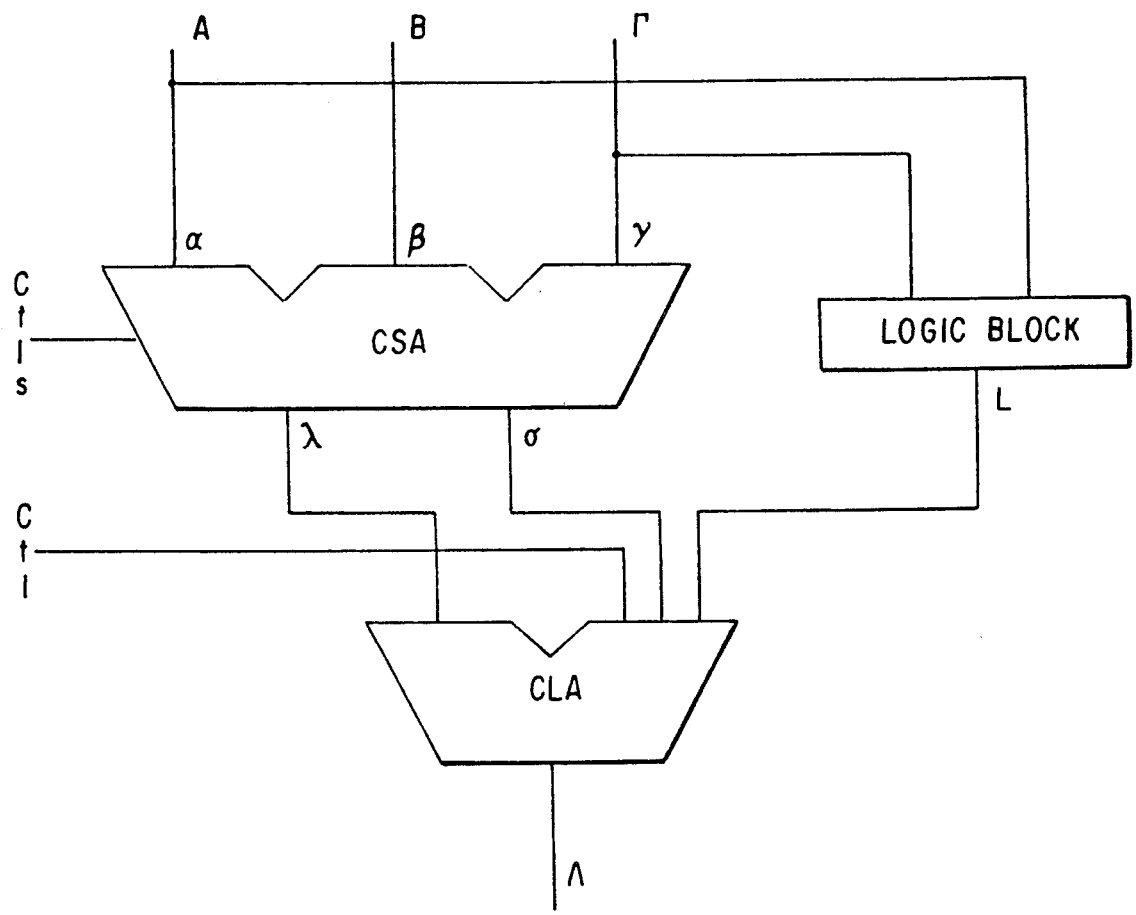
FIG. 11 illustrates Datablow for fast implementation of interlock collapsing ALU - implementation 3 not supporting post adder logic operations.

A condition code predictor for fixed-point arithmetic units has been reported in the literature, as referenced above regarding the Int. J. Electronics, vol. 66, No. 6, pp. 887–890 article os S. Vassiliadis and M. Putrino titled "Condition Code Predictor for Fixed-point Arithmetic Units". In general, that prior scheme can not be utilized in the ALU implementations presented thus far because the results of the adder can be modified by a logical operation between the results and a third operand. No prediction scheme for this scenario is known. The requirement for executing logical operations between the results of the adder and a third operand arise from the collapsing of interlocks between two instructions specifying ALU operations in which the second instruction specifies a logical operation. The collapsing of such interlocks does not have to be supported. If these interlocks are not supported, the prediction scheme reported in the reference, supra. (Int. J. Electronics, vol. 66, No. 6, pp. 887–890) can be adapted to the ALU described in detail in the co-pending application which we have concurrently filed entitled "Early SCISM ALU Status Determination", U.S. Ser. No. 07/677,692, filed Mar. 29, 1991. In the following FIGS. 9, 10 and 11, modifications to the three implementations are shown for the above restrictions. FIG. 9 illustrates dataflow for fast implementation of interlock collapsing ALU-implementation 1 not supporting post adder logic operations. FIG. 10 illustrates dataflow for fast implementation of interlock collapsing ALU-implementation 2 not supporting post adder logic operations, and FIG. 11 illustrates dataflow for fast implementation of interlock collapsing ALU-implementation 3 not supporting post adder logic operations. A discussion of the applicability of the prediction scheme to an interlock collapsing ALU, however, need not be detailed in this application because they are detailed in the concurrently filed application just identified.

The above relaxations in the requirements for the ALU reflect mostly in the design of the CLA and the CLA controls of the ALU. With these restrictions, a conventional CLA can be used in the ALU rather than the modified CLA presented earlier. The additional controls to specify the appropriate action within the modified CLA are also removed as is the path from B to the CLA. For the second implementation the number of inputs to the ALU is reduced from six to five along with the removal of the path from one of the inputs to the CLA controls. These affects are reflected in dataflows for the three implementations shown in FIG. 9 to FIG. 11.

A smaller simplification of the design is reflected in the front end of the ALU. This results from the fewer number input requirements to the CLA. For the first implementation, the operand, B, can always be applied to the CSA; therefore, the two-to-one multiplexer in the B path (compare FIG. 6 with FIG. 9) can be removed along with eliminating the corresponding control. In the third implementation, the simplification is reflected in the expression that most be implemented for $\lambda_i$. For the assumptions, $\lambda_i$ can be expressed as:

$$\lambda_i = \alpha_i \beta_i \Omega_1 + \alpha_i \gamma_i \Omega_1 + \beta_i \gamma_i \Omega_1 + \beta_{i-1} \Omega_3.$$

As a result, one control signal is also saved in this implementation. In addition, the decodes for the control signals are simplified.

That the design of the ALU is simplified for the above assumptions can be seen from the previous discussion. In addition, condition codes can be generated earlier in the execution cycle. However, these advantages are obtained at the expense of bubbling the pipeline when the above interlocks occur. The choice between these alternatives will depend upon the application, the probability of executing instruction streams in which the above interlocks occur, as well as upon the branching scheme for the machine. The choice is an implementation decision.

Clearly, the inventions we have described by way of example and in various implementations of the best way for practicing the inventions provide the basis for much potential growth in processor performance. Accordingly, it will be understood that those skilled in the art after reviewing our presently contemplated implementations, both now and in the future, will envision further improvements and enhancements, even such as may be deemed inventions, and these should be understood to be within the scope of the following claims which should be construed to fully protect and maintain the inventors rights which are to be accorded.

What is claimed is:

1. An apparatus for a 3-1 two's complement and unsigned number notation in an ALU that executes a pair of interlocked instructions comprising:

a carry save adder (CSA) having three inputs for two unique operands and one common operand specified by said pair of interlocked instructions, said CSA having a carry output and a sum output; and a 2-1 carry-look-ahead adder (CLA) having two inputs coupled to said CSA carry and sum outputs, said CLA having an output for providing a sum equation output based upon inputs to said CLA; and a pre-CLA adder logical block coupled to operate in parallel with said CSA and having two inputs coupled to two unique inputs of said CSA and having an output coupled, along with a carry output of said CSA, to said CLA; and a post-CLA adder logical block coupled to receive said sum equation output from said CLA and a common one of the three inputs to the CSA; and wherein when a true or complement input of two unique and one common input operands specified by the pair of interlocked instructions is an input to the CSA, the CSA produces a carry and sum output; and the pre-CLA logical block is coupled to operate in parallel with the CSA and to receive the true or complement input of three unique input operands specified by the pair of interlocked instructions; and the output of the pre-CLA logical block is ORed with the carry from the CSA for providing one input to said CLA combining a carry output of said CSA and said output of said pre-CLA logical block; and the sum from the CSA is coupled to form a second input to the CLA; and the sum equation output of the CLA and the common operand input to the CSA are inputs into the post CLA logical block and logically combined for outputting an AND, OR, or EXCLUSIVE-OR signal which is then logically combined with the sum equation from the CLA to provide a conceptual sequential operation for said pair of interlocked instructions.

2. The apparatus according to claim 1 wherein the ALU operations corresponding to the execution of an interlocked pair of instructions produce the ALU operations of: arithmetic followed by arithmetic; logical followed by arithmetic; arithmetic followed by logical; and logical followed by logical.

3. The apparatus according to claim 2 wherein the ALU operations are characterized by the form of:

| | |
|---|---|
| Category 1: A + B + Γ | Arithmetic followed by Arithmetic |
| Category 2: B + (A LOP Γ) | Logical followed by Arithmetic |
| Category 3: B LOP (A + Γ) | Arithmetic followed by Logical |
| Category 4: B LOP (A LOP Γ) | Logical followed by Logical. | where A, B, and Γ correspond to the operands supplied to the said 3-1 ALU apparatus.

4. The apparatus according to claim 1 wherein the apparatus has no more logic stages than a 3-1 binary adder.

5. The apparatus according to claim 1 wherein the said pre-adder logical block has an output for a pair of instructions logical followed by arithmetic and logical followed by logical produced by $L_i$ where $L_i$ can be calculated by:

$$L_i = A_i \Gamma_i \Omega_{AND} \overline{\Omega}_I + A_i \Omega_{OR} \overline{\Omega}_I + \Gamma_i \Omega_{OR} \overline{\Omega}_I$$
$$+ \overline{A}_i \Gamma_i \Omega_{XOR} \Omega_I + A_i \overline{\Gamma}_i \Omega_{XO}$$
$$R \overline{\Omega}_I + (\overline{A}_i + \overline{\Gamma}_i) \Omega_{AND} \Omega_I + \overline{A}_i \overline{\Gamma}_i \Omega_{OR} \Omega_I$$
$$+ A_i \Gamma_i \Omega_{XOR} \Omega_I + \overline{A}_i \overline{\Gamma}_i \Omega_{XOR} \Omega_I$$

$$L_i = A_i \Gamma_i \Omega_{AND} \overline{\Omega}_I + A_i \Omega_{OR} \overline{\Omega}_I + \Gamma_i \Omega_{OR} \overline{\Omega}_I$$
$$+ \overline{A}_i \Gamma_i \Omega_{XOR} \Omega_I + A_i \overline{\Gamma}_i \Omega_{XOR} \Omega_I + \overline{A}_i \Omega_{AND} \Omega_I + \overline{\Gamma}_i \Omega_{AND} \Omega_I$$
$$+ \overline{A}_i \overline{\Gamma}_i \Omega_{OR} \Omega_I + A_i \Gamma_i \Omega_{XOR} \Omega_I + \overline{A}_i \overline{\Gamma}_i \Omega_{XOR} \Omega_I,$$

and wherein the assigned signal description is:

| Signal | Description |
|---|---|
| $\Omega_{AND}$ | AND operands 1 and 2 |
| $\Omega_{OR}$ | OR operands 1 and 2 |
| $\Omega_{XOR}$ | COR operands 1 and 2 |
| $\Omega_I$ | Invert the result of the logical operation. |

6. The apparatus according to claim 1 wherein said pre-adder logical block has an output of the pre-adder logical block for a pair of instructions logical followed by arithmetic and logical followed by logical produced by $L_i$ where $L_i$ can be calculated by:

$$L_i = L_{li}(\Omega_{OR}\overline{\Omega}_I + \Omega_{AND}\Omega_I) + L_{ri}(\Omega_{OR}\overline{\Omega}_I + \Omega_{AND}\Omega_I)$$
$$+ L_{li}L_{ri}(\Omega_{AND}\overline{\Omega}_I + \Omega_{XOR}\Omega_I + \Omega_{XOR}\overline{\Omega}_I) + \overline{L}_{li}\overline{L}_{ri}(\Omega_{OR}\Omega_I + \Omega_{XOR}\overline{\Omega}_I$$
$$+ \Omega_{XOR}\Omega_I)x.$$

7. The apparatus according to claim 1 wherein said pre-adder logical block has an output of the pre-adder logical block for a pair of instructions logical followed by arithmetic and logical followed by logical produced by $L_i$ where $L_i$ can be calculated by:

$$L_i = \underline{L}_{li}\Omega_{OALASL} + L_{ri}\Omega_{OALASL} + L_{li}L_{ri}\Omega_{XAAL} + \overline{L}_{li}L_{ri}\Omega_{XOSL},$$

where $$\Omega_{OALASL} = \Omega_{OR}\overline{\Omega}_I + \Omega_{AND}\Omega_I$$

$$\Omega_{XAAL} = \Omega_{XOR}\overline{\Omega}_I + \Omega_{XOR}\Omega_I + \Omega_{AND}\overline{\Omega}_I = \Omega_{XOR} + \Omega_{AND}\overline{\Omega}_I$$

$$\Omega_{XOSL} = \Omega_{XOR1}\overline{\Omega}_I + \Omega_{XOR}\Omega_I + \Omega_{OR}\Omega_I$$
$$= \Omega_{XOR} + \Omega_{OR}\Omega_I.$$

8. The apparatus according to claim 7 wherein the output of the pre-adder logical block requires the same number of logic stages as a CSA.

9. The apparatus according to claim 1 wherein the inputs of the CSA of 1 are controlled to produce outputs so that they support selection between them and a parallel output of the pre-adder logic block.

10. The apparatus according to claim 9 wherein said apparatus is configured to allow the CLA to select between the output of said pre-adder logical block and the carry of the CSA.

11. The apparatus according to claim 9 wherein said input control is achieved by forcing the inputs, $\alpha_i$ and $\gamma_i$ to 0 when the first instruction of an interlocked instruction pair specifies a logical operation, and the sum and carry become:

$$\sigma_i = 0\overline{\beta}_i 1 + 1\beta_i 1 + 1\overline{\beta}_i 0 + 0\beta_i 0 = \beta_i \quad 0 \leq i \leq 31$$

$$\lambda_i = 0\beta_i + 00 + \beta_i 0 = 0 \quad 0 \leq i \leq 31$$

$$\lambda_i = \tau_2 = 0 \quad i = 32.$$

12. The apparatus according to claim 9 wherein said input control is achieved by forcing the input $\beta_i$ to 0 when the first instruction of an interlocked instruction pair specifies a arithmetic operation, and the second instruction specifies a logical operation, and the sum and the carry become:

$$\sigma_i = \alpha_i 1 \overline{\gamma_i} + \overline{\alpha_i} 0 \overline{\gamma_i} + \overline{\alpha_i} 1 \gamma_i + \alpha_i 0 \gamma_i = \alpha_i \forall \gamma_i \quad 0 \leq i \leq 31$$
$$\lambda_i = \alpha_i 0 + \alpha_i \gamma_i + 0 \beta_i = \alpha_i \gamma_i \quad 0 \leq i \leq 31$$
$$\lambda_i = \tau_2 = 0 \quad i = 32.$$

13. The apparatus according to claim 9 wherein said input control is achieved by forcing all of the inputs to the CSA to 0 when a first instruction and a second instruction of said pair both specify logical operations and the sum and the carry become 0 as required.

14. The apparatus according to claim 1 wherein the CSA carry and the logic block output are selected as one of the two inputs to the CLA.

15. The apparatus of claim 14 wherein one of the two inputs to the CLA is selected by $\lambda_{i+1} + L_i$, $\lambda_{i+1}$ being the carry output of the CSA and $L_i$ being the output of the pre-adder logical block.

16. The apparatus according to claim 1 wherein an input to the CLA is the sum from the CSA.

17. The apparatus according to claim 14 wherein an other of the two inputs CLA is the sum from the CSA.

18. The apparatus according to claim 1 wherein said a post-adder logical operation when the second instruction of an interlocked pair specifies a logical operation is embedded in the sum equation of the CLA.

19. The apparatus according to claim 18 wherein the sum of the CLA incorporating the post-logical operations is computed by:

$$\Lambda_i = S_i \Xi_{ADD} + (S_i + B_i) \Xi_{OR} + (S_i B_i) \Xi_{AND} + (S_i \forall B_i) \Xi_{XOR}.$$

20. The apparatus according to claim 18 wherein the sum of the CLA incorporating the post-logical operations is computed by:

$$\Lambda_i = \mu_i \phi_{i+1} + \theta_i \overline{\phi_{i+1}} + \Xi_{SOMi},$$

where $$\mu_i = M_i \Xi_{GENi} + \overline{M_i} \Xi_{SXMi}$$

and, $$\theta_i = H_i \Xi_{GENi} + \overline{H_i} \Xi_{SXMi},$$

and, $$\Xi_{GENi} = \Xi_{ADD} + \Xi_{OR} + B_i \Xi_{AND} + \overline{B_i} \Xi_{XOR}$$

$$\Xi_{SXMi} = B_i \Xi_{XOR}$$

$$\Xi_{SOMi} = B_i \Xi_{OR}.$$

21. The apparatus according to claim 18 wherein the sum of the CLA incorporating the post-logical operations is computed by:

$$\Lambda_0 = \mu_0^* G_1^{tn} + \mu_0 T_2^{n+1} \phi_{n+1}^z + \theta_0 \overline{G_1^{*n}} \overline{T_2^{n+1}} + \theta_0 \overline{G_1^{*n}} \overline{\phi_{n+1}^z},$$

where $$\phi_1 = G_1^{*n} + T_2^{n+1} \phi_{n+1}$$

and $$\mu_0^* = \mu_0 + \Xi_{SOM0},$$

and $$G_1^{tn} = G_1^{*n} + \Xi_{SOM0},$$

and $$\mu_0 = M_0 \Xi_{GEN0} + \overline{M_0} \Xi_{SXM0}$$

$$\theta_0 = H_0 \Xi_{GEN0} + \overline{H_0} \Xi_{SXM0}.$$

22. The apparatus according to claim 1 wherein a 3-1 ALU operation can be performed with no additional delay than a 3-1 binary addition.

23. The apparatus according to claim 1 wherein the 3-1 ALU operation is performed with 5 stages characterized by:

STAGE 1 (CSA)
$$L_i = L_{li} \Omega_{OALASL} + L_{ri} \Omega_{OALASL} + L_{li} L_{ri} \Omega_{XAAL} + \overline{L_{li} L_{ri}} \Omega_{XOSL}$$
$$\overline{L_i} = L_{li} \Omega_{OALASL} + L_{ri} \Omega_{OALASL} + L_{li} L_{ri} \Omega_{XAAL} + \overline{L_{li} L_{ri}} \Omega_{XOSL}$$
$$\sigma_i = \alpha_i \beta_i \overline{\gamma_i} + \overline{\alpha_i} \beta_i \overline{\gamma_i} + \overline{\alpha_i} \beta_i \gamma_i + \alpha_i \beta_i \gamma_i \quad 0 \leq i \leq 31$$
$$\overline{\sigma_i} = \alpha_i \beta_i \overline{\gamma_i} + \overline{\alpha_i} \beta_i \overline{\gamma_i} + \overline{\alpha_i} \beta_i \overline{\gamma_i} + \alpha_i \beta_i \gamma_i \quad 0 \leq i \leq 31$$
$$\lambda_i = \alpha_i \beta_i + \alpha_i \gamma_i + \beta_i \gamma_i \quad 0 \leq i \leq 31$$
$$\overline{\lambda_i} = \alpha_i \beta_i + \alpha_i \gamma_i + \beta_i \gamma_i \quad 0 \leq i \leq 31$$
$$\lambda_i = \tau_2 \quad i = 32$$
$$\Xi_{GENi} = \Xi_{ADD} + \Xi_{OR} + B_i \Xi_{AND} + \overline{B_i} \Xi_{XOR}$$
$$\Xi_{SXMi} = B_i \Xi_{XOR}$$
$$\Xi_{SOMi} = B_i \Xi_{OR}$$

STAGE 2 (CLA)
$$G_i^{i+1 *} = \lambda_{i+1} \sigma_i + \lambda_{i+2} \sigma_{i+1} + L_i \sigma_i + L_{i+1} \sigma_{i+1}$$
$$i = 1, 3, 5, \ldots 29$$
$$T_i^{i+1} = \overline{\lambda_{i+1} L_i \sigma_i} + \overline{\lambda_{i+2} L_{i+1} \sigma_{i+1}} \quad i = 2, 4, 6, \ldots 30$$
$$T_1 = \lambda_2 + L_1 + \sigma_1$$
$$H_0 = \overline{\lambda_1 L_0 \sigma_0} + \lambda_1 \overline{\sigma_0} + L_0 \overline{\sigma_0}$$
$$\overline{H_0} = \overline{\lambda_1 L_0 \sigma_0} + \lambda_1 \sigma_0 + L_0 \sigma_0$$
$$\phi_{31} = \lambda_{32} \sigma_{31} + L_{31} \sigma_{31} + \tau$$

STAGE 3 (CLA)
$$G_i^{i+5 *} = G_i^{i+1 *} + T_{i+1}^{i+2} G_{i+2}^{i+3 *} + T_{i+1}^{i+2} T_{i+3}^{i+4} G_{i+4}^{i+5 *}$$
$$i = 1, 7, 13, 19$$
$$T_i^{i+5} = T_i^{i+1} T_{i+2}^{i+3} T_{i+4}^{i+5} \quad i = 2, 8, 14$$
$$M_0 = H_0 \forall T_1$$
$$\overline{M_0} = \overline{H_0 \forall T_1}$$
$$\theta_0 = H_0 \Xi_{GEN0} + \overline{H_0} \Xi_{SXM0}$$
$$\mu_0 = H_0 \overline{T_1} \Xi_{GEN0} + \overline{H_0} T_1 \Xi_{GEN0} + H_0 T_1 \Xi_{SXM0} + \overline{H_0} \overline{T_1} \Xi_{SXM0}$$
$$\phi_{27}^{31} = G_{27}^{28 *} + T_{28}^{29} G_{29}^{30 *} + T_{28}^{29} T_{30}^{31} \phi_{31}$$

STAGE 4 (CLA)
$$G_1^{18 *} = G_1^{6 *} + T_2^7 G_7^{12 *} + T_2^7 T_8^{13} G_{13}^{18 *}$$
$$\overline{G_1^{18}} = \overline{G_1^{6 *} + T_2^7 G_7^{12 *} + T_2^7 T_8^{13} G_{13}^{18 *}} + \Xi_{SOM0}$$
$$T_2^{19} = T_2^7 T_8^{13} T_{14}^{19}$$
$$\mu_0^* = \mu_0 + \Xi_{SOM0}$$
$$\phi_{19}^{26} = G_{19}^{24 *} + T_{20}^{25} G_{25}^{28 *} + T_{20}^{25} T_{26}^{27} \phi_{27}^{31}$$

STAGE 5 (CLA)
$$\Lambda_0 = \mu_0^* G_1^{18} + \mu_0 T_2^{19} \phi_{19}^{26} + \theta_0 \overline{G_1^{18 *}} \overline{T_2^{19}} + \theta_0 \overline{G_1^{18 *}} \overline{\phi_{19}^{26}}.$$

24. The apparatus according to claim 1 wherein the generation of the result for arithmetic followed by arithmetic is computed in 5 stages and characterized by:

for generating $A+B+\Gamma$ the signals controlling the front end of the ALU are:

$\Omega_{OALASL} = 0$ $\Omega_{XAAL} = 0$ $\Omega_{XOSL} = 0$ while the signals controlling the CLA are:

$\Xi_{ADD} = 1$ $\Xi_{OR} = 0$ $\Xi_{AND} = 0$ $\Xi_{XOR} = 0$, and the computational stages are:

STAGE 1
$L_i = 0$
$\sigma_i = \alpha_i\bar{\beta}\bar{\gamma}_i + \alpha_i\bar{\beta}\gamma_i + \bar{\alpha}_i\bar{\beta}\gamma_i + \alpha_i\beta_i\gamma_i \; 0 \leq i \leq 31$
$\lambda_i = \alpha_i\beta_i + \alpha_i\gamma_i + \beta_i\gamma_i \; 0 \leq i \leq 31$
$\lambda_i = \tau_2 \; i = 32$
$\Xi_{GENi} = 1$
$\Xi_{SXMi} = 0$
$\Xi_{SOMi} = 0$ STAGE 2
$G_i^{i+1*} = \lambda_{i+1}\sigma_i + \lambda_{i+2}\sigma_{i+1} \; i = 1, 3, 5, \ldots 29$
$T_i^{i+1} = \overline{\lambda_{i+1}\sigma_i} + \overline{\lambda_{i+2}\sigma_{i+1}} \; i = 2, 4, 6, \ldots 30$
$T_1 = \lambda_2 + \sigma_1$
$H_0 = \lambda_1\sigma_0 + \lambda_1\bar{\sigma}_0$
$\bar{H}_0 = \overline{\lambda_1\bar{\sigma}_0} + \overline{\lambda_1\sigma_0}$
$\phi_{31} = \lambda_{32}\sigma_{31} + \tau_1$ STAGE 3
$G_i^{i+5*} = G_i^{i+1*} + T_{i+1}^{i+2}G_{i+2}^{i+3*} + T_{i+1}^{i+2}T_{i+3}^{i+4}G_{i+4}^{i+5*} \; i = 1, 7, 13, 19$
$T_i^{i+5} = T_i^{i+1}T_{i+2}^{i+3}T_{i+4}^{i+5} \; i = 2, 8, 14$
$M_0 = H_0 \forall T_1$
$\bar{M}_0 = \bar{H}_0 \forall T_1$
$\theta_0 = H_0$
$\mu_0 = H_0\bar{T}_1 + \bar{H}_0 T_1 = M_0$
$\phi_{27}^{31} = G_{27}^{28*} + T_{28}^{29}G_{29}^{30*} + T_{28}^{29}T_{30}^{31}\phi_{31}$ STAGE 4
$G_1^{18*} = G_1^{6*} + T_2^7 G_7^{12*} + T_2^7 T_8^{13} G_{13}^{18*}$
$\overline{G_1^{18}} = \overline{G_1^{6*} + T_2^7 G_7^{12*} + T_2^7 T_8^{13} G_{13}^{18*}} = \overline{G_1^{18*}}$
$T_2^{19} = T_2^7 T_8^{13} T_{14}^{19}$
$\lambda_0^* = M_0$
$\phi_{19}^{26} = G_{19}^{24*} + T_{20}^{25}G_{25}^{26*} + T_{20}^{25}T_{26}^{27}\phi_{27}^{31}$ STAGE 5
$\Lambda_0 = \mu_0^* G_1^{18} + \mu_0 T_2^{19}\phi_{19}^{26} + \theta_0 \overline{G_1^{18*}} \cdot \overline{T_2^{19}} + \theta_0 \overline{G_1^{18*}} \cdot \overline{\phi_{19}^{26}}$, and wherein substituting the expressions for $\mu_0, \mu_0^*, \theta_0$, and $G_1^{+18}$, the output expression becomes:

$\Lambda_0 = M_0 G_1^{*18} + M_0 T_2^{19} \phi_{19}^{26} + H_0 \overline{G_1^{*18}} T_2^{19} + H_0 \overline{G_1^{*8}} \overline{\phi_{19}^{26}}$ 25. The apparatus according to claim 1 wherein the generation of the result for arithmetic followed by logical is computed in 5 stages and characterized by:

STAGE 1
$L_i = A_i LOP\Gamma_i$
$\sigma_i = \beta_i = B_i \; 0 \leq i \leq 31$,
$\lambda_i = 0 \; 0 \leq i \leq 31$
$\lambda_i = \tau_2 = 0 \; i = 32$
$\Xi_{GENi} = 1$
$\Xi_{SXMi} = 0$
$\Xi_{SOMi} = 0$ STAGE 2
$G_i^{i+1*} = L_i B_i + L_{i+1}B_{i+1} \; i = 1, 3, 5, \ldots 29$
$T_i^{i+1} = \overline{L_i B_i} + \overline{L_{i+1}B_{i+1}} \; i = 2, 4, 6, \ldots 30$
$T_1 = L_1 + B_1$
$H_0 = L_0 B_0 + L_0 \bar{B}_0$
$\bar{H}_0 = \overline{L_0 \bar{B}_0} + \overline{L_0 B_0}$
$\phi_{31} = L_{31}B_{31} + \tau_1$ STAGE 3
$G_i^{i+5*} = G_i^{i+1*} + T_{i+1}^{i+2}G_{i+2}^{i+3*} + T_{i+1}^{i+2}T_{i+3}^{i+4}G_{i+4}^{i+5*} \; i = 1, 7, 13, 19$
$T_i^{i+5} = T_i^{i+1}T_{i+2}^{i+3}T_{i+4}^{i+5} \; i = 2, 8, 14$
$M_0 = H_0 \forall T_1$
$\bar{M}_0 = \bar{H}_0 \forall T_1$
$\theta_0 = H_0$
$\mu_0 = H_0\bar{T}_1 + \bar{H}_0 T_1 = M_0$
$\phi_{27}^{31} = G_{27}^{28*} + T_{28}^{29}G_{29}^{30*} + T_{28}^{29}T_{30}^{31}\phi_{31}$ STAGE 4
$G_1^{18*} = G_1^{6*} + T_2^7 G_7^{12*} + T_2^7 T_8^{13} G_{13}^{18*}$
$\overline{G_1^{18}} = \overline{G_1^{6*} + T_2^7 G_7^{12*} + T_2^7 T_8^{13} G_{13}^{18*}} = \overline{G_1^{18*}}$
$T_2^{19} = T_2^7 T_8^{13} T_{14}^{19}$
$\mu_0^* = M_0$
$\phi_{19}^{26} = G_{19}^{24*} + T_{20}^{25}G_{25}^{26*} + T_{20}^{25}T_{26}^{27}\phi_{27}^{31}$ STAGE 5
$\Lambda_0 = \mu_0^* G_1^{18} + \mu_0 T_2^{19}\phi_{19}^{26} + \theta_0 \overline{G_1^{18*}} \cdot \overline{T_2^{19}} + \theta_0 \overline{G_1^{18*}} \cdot \overline{\phi_{19}^{26}}$ 26. The apparatus according to claim 1 wherein the generation of the result for logical followed by arithmetic is computed in 5 stages and characterized by:

STAGE 1
$L_i = 0$
$\sigma_i = \alpha_i \bar{\gamma}_i + \bar{\alpha}_i \gamma_i \; 0 \leq i \leq 31$,
$\lambda_i = \alpha_i \gamma_i \; 0 \leq i \leq 31$
$\lambda_i = \tau_2 = 0 \; i = 32$
$\Xi_{GENi} = \bar{B}_i$
$\Xi_{SXMi} = B_i$
$\Xi_{SOMi} = 0$ STAGE 2
$G_i^{i+1*} = \lambda_{i+1}\sigma_i + \lambda_{i+2}\sigma_{i+1} \; i = 1, 3, 5, \ldots 29$
$T_i^{i+1} = \overline{\lambda_{i+1}\sigma_i} + \overline{\lambda_{i+2}\sigma_{i+1}} \; i = 2, 4, 6, \ldots 30$
$T_1 = \lambda_2 + \sigma_1$
$H_0 = \lambda_1\sigma_0 + \lambda_1\bar{\sigma}_0$
$\bar{H}_0 = \overline{\lambda_1\bar{\sigma}_0} + \overline{\lambda_1\sigma_0}$
$\phi_{31} = \lambda_{32}\sigma_{31} + \tau_1$ STAGE 3
$G_i^{i+5*} = G_i^{i+1*} + T_{i+1}^{i+2}G_{i+2}^{i+3*} + T_{i+1}^{i+2}T_{i+3}^{i+4}G_{i+4}^{i+5*} \; i = 1, 7, 13, 19$
$T_i^{i+5} = T_i^{i+1}T_{i+2}^{i+3}T_{i+4}^{i+5} \; i = 2, 8, 14$
$M_0 = H_0 \forall T_1$
$\bar{M}_0 = \bar{H}_0 \forall T_1$
$\theta_0 = H_0 B_0 + \bar{H}_0 B_0$
$\mu_0 = H_0 \bar{T}_1 \bar{B}_0 + H_0 T_1 B_0 + \bar{H}_0 T_1 B_0 + \bar{H}_0 T_1 B_0 = M_0 B_0 + M_0 \bar{B}_0$
$\phi_{27}^{31} = G_{27}^{28*} + T_{28}^{29}G_{29*30}^{30*} + T_{28}^{29}T_{30}^{31}\phi_{31}$ STAGE 4
$G_1^{18*} = G_1^{6*} + T_2^7 G_7^{12*} + T_2^7 T_8^{13} G_{13}^{18*}$
$\overline{G_1^{18}} = \overline{G_1^{6*} + T_2^7 G_7^{12*} + T_2^7 T_8^{13} G_{13}^{18*}} = \overline{G_1^{18*}}$
$T_2^{19} = T_2^7 T_8^{13} T_{14}^{19}$
$\mu_0^* = M_0 \bar{B}_0 + \bar{M}_0 B_0$
$\phi_{19}^{26} = G_{19}^{24*} + T_{20}^{25}G_{25}^{26*} + T_{20}^{25}T_{26}^{27}\phi_{27}^{31}$ STAGE 5
$\Lambda_0 = \mu_0^* G_1^{18} + \mu_0 T_2^{19}\phi_{19}^{26} + \theta_0 \overline{G_1^{18*}} \cdot \overline{T_2^{19}} + \theta_0 \overline{G_1^{18*}} \cdot \overline{\phi_{19}^{28}}$, and where substituting $\mu_0, \mu_0^*, \theta_0$, and $G_1^{+18}$ in the expresson for $\Lambda_0$ produces:

$\Lambda_0 = (M_0 \bar{B}_0 + \bar{M}_0 B_0) G_1^{*18} + (M_0 \bar{B}_0 + \bar{M}_0 B_0) T_2^{19} \phi_{19}^{26} +$
$(H_0 \bar{B}_0 + \bar{H}_0 B_0) \overline{G_1^{*18}} \; \overline{T_2^{19}} + (H_0 \bar{B}_0 + \bar{H}_0 B_0) \overline{G_1^{*18}} \; \overline{\phi_{19}^{26}}$.

$\Lambda_0 = M_0 \bar{B}_0 G_1^{*18} + \bar{M}_0 B_0 G_1^{*18} + M_0 \bar{B}_0 T_2^{19} \phi_{19}^{26} + \bar{M}_0 B_0 T_2^{19} \phi_{19}^{26} +$
$H_0 \bar{B}_0 \overline{G_1^{*18}} \; \overline{T_2^{19}} + \bar{H}_0 B_0 \overline{G_1^{*18}} \; \overline{T_2^{19}} + H_0 \bar{B}_0 \overline{G_1^{*18}} \; \overline{\phi_{19}^{26}} + \bar{H}_0 B_0 \overline{G_1^{*18}} \; \overline{\phi_{19}^{26}}$ $\Lambda_0 = (M_0 G_1^{*18} + M_0 T_2^{19} \phi_{19}^{26} + H_0 \overline{G_1^{*18}} \; \overline{T_2^{19}} + H_0 \overline{G_1^{*18}} \; \overline{\phi_{19}^{26}}) \bar{B}_0 +$
$(\bar{M}_0 G_1^{*18} + \bar{M}_0 T_2^{19} \phi_{19}^{26} + \bar{H}_0 \overline{G_1^{*18}} \; \overline{T_2^{19}} + \bar{H}_0 \overline{G_1^{*18}} \; \overline{\phi_{19}^{26}}) B_0$.

27. An apparatus for executing a pair of interlocked instructions comprising:

3-1 addition means for addition of two's complement and unsigned numbers for executing interlocked instructions in parallel for pairs of interlocked instructions, said means including:
a carry save adder (CSA) coupled to two unique and one common operand specified by a pair of interlocked instructions
and a pre-adder logical block coupled for parallel operation on two unique inputs of said three inputs specified by said pair of interlocked instructions as inputs to said 3-1 addition means,
a carry-look-ahead adder (CLA) for receiving the sum and a carry from the CSA, with the carry logically combined with the output of said pre-adder block; and
a post-adder logical block receiving a sum equation output from said CLA and the common operand for providing the logically combined output as the result of conceptual sequential operation for said pair of interlocked instruction.

28. The apparatus according to claim 27 wherein the ALU operations corresponding to the execution of an interlocked pair of instructions produces the ALU operations of: arithmetic followed by arithmetic; logical followed by arithmetic; arithmetic followed by logical; and logical followed by logical.

29. The apparatus according to claim 27 wherein the ALU operations are characterized by the form of:

| | |
|---|---|
| Category 1: A + B + Γ | Arithmetic followed by Arithmetic |
| Category 2: B + (A LOP Γ) | Logical followed by Arithmetic |
| Category 3: B LOP (A + Γ) | Arithmetic followed by Logical |
| Category 4: B LOP (A LOP Γ) | Logical followed by Logical. | where A, B, and Γ correspond to the operands supplied to the said 3-1 ALU apparatus.

30. The apparatus according to claim 27 wherein the apparatus has no more logic stages than a 3-1 binary adder.

31. The apparatus according to claim 27 wherein the output of the pre-adder logical block for a pair of instructions logical followed by arithmetic and logical followed by logical is produced by $L_i$ wherein $L_i$ can be calculated by:

$$L_i = L_{li}\Omega_{OALASL} + L_{ri}\Omega_{OALASL} + \overline{L_{li}}L_{ri}\Omega_{XAAL} + \overline{L_{li}L_{ri}}\Omega_{XAAL}.$$

32. The apparatus according to claim 27 wherein one input for the CLA is set by $$\sigma_i\Omega_4 + L_i$$

where the control signal $\Omega_4 = 1$ and $L_i = 0$ for category 1 and $\Omega_4 = 0$ and $L_i$ provides a valid input for the remaining categories.

33. The apparatus according to claim 27 wherein one input of the CLA is set by $$\lambda_i = \alpha_i\beta_i\Omega_1 + \alpha_i\gamma_i\Omega_2 + \beta_i\gamma_i\Omega_1 + \beta_{i-1}\Omega_3.$$

34. The apparatus according to claim 33 is set by $$\lambda_i = \alpha_i\beta_i\Omega_1 + \alpha_i\gamma_i\Omega_2 + \beta_i$$

$$\gamma_i\Omega_1 + \beta_{i-1}\Omega_3,$$

where $\Omega_1 = \Omega_2 = 1$ and $\Omega_3 = 0$ for category 1, $\Omega_1 = \Omega_2 0$ and $\Omega_3 = 1$ for category 2, $\Omega_1 = \Omega_3 = 0$ and $\Omega_2 = 1$ for category 3 and $\Omega_1 = \Omega_2 = \Omega_3 = 0$ for category four.

35. The apparatus according to claim 32 wherein the inputs are incorporated in the logical equations of the CLA.

36. The apparatus according to claim 35 wherein the incorporation is achieved by the following devices $$G_i^{*i+1} = (\sigma_i\Omega_4 + L_i)\lambda_{i+1} + (\sigma_{i+1}\Omega_4 + L_{i+1})\lambda_{i+2}$$

$$G_i^{*i+1} = \sigma_i\Omega_4\lambda_{i+1} + L_i\lambda_{i+1} + \sigma_{i+1}\Omega_4\lambda_{i+2} + L_{i+1}\lambda_{i+2};$$

and wherein the half sum, $H_i$ becomes:

$$H_0 = (\sigma_i\Omega_4 + L_i)\forall \lambda_{i+1}$$

$$H_0 = \overline{(\sigma_i\Omega_4 + L_i)}\lambda_{i+1} + (\sigma_i\Omega_4 + L_i)\overline{\lambda_{i+1}}$$

$$H_0 = \overline{\sigma_i\Omega_4}\overline{L_i}\lambda_{i+1} + \sigma_i\Omega_4\overline{\lambda_{i+1}} + L_i\overline{\lambda_{i+1}}$$

$$H_0 = (\overline{\sigma_i} + \overline{\Omega_4})\overline{L_i}\lambda_{i+1} + \sigma_i\Omega_4\overline{\lambda_{i+1}}L_i\overline{\lambda_{i+1}}$$

$$H_0 = \overline{\sigma_i}\overline{L_i}\lambda_{i+1} + \overline{\Omega_4}\overline{L_i}\lambda_{i+1} + \sigma_i\Omega_4\overline{\lambda_{i+1}}L_i\overline{\lambda_{i+1}};$$

and wherein a new carry is:

$$\phi_{31} = (\sigma_{31}\Omega_4 + L_{31})\lambda_{32} + \tau_1$$

$$\phi_{31} = \sigma_{31}\Omega_4\lambda_{32} + L_{31}\lambda_{32} + \tau_1;$$

and wherein a pseudo-transmit from i to 1+1 can be generated as:

$$T_i^{j+1} = (\sigma_i\Omega_4 + L_i + \lambda_{i+1})(\sigma_{i+1}\Omega_4 + L_{i+1} + \lambda_{i+2})$$

$$T_i^{j+1} = \overline{(\sigma_i\Omega_4 + L_i\lambda_{i+1})}\ \overline{(\sigma_{i+1}\Omega_4 + L_{i+1} + \lambda_{i+2})}$$

$$T_i^{j+1} = \overline{\overline{(\sigma_i\Omega_4 + L_i + \lambda_{i+1})}\ \overline{(\sigma_{i+1}\Omega_4 + L_{i+1} + \lambda_{i+2})}}$$

$$T_i^{j+1} = \overline{\overline{\sigma_i\Omega_4}\overline{L_i}\overline{\lambda_{i+1}} + \overline{\sigma_{i+1}\Omega_4}\overline{L_{i+1}}\overline{\lambda_{i+2}}}$$

$$T_i^{j+1} = \overline{(\overline{\sigma_i} + \overline{\Omega_4})\overline{L_i}\overline{\lambda_{i+1}} + (\overline{\sigma_{i+1}} + \overline{\Omega_4})\overline{L_{i+1}}\overline{\lambda_{i+2}}}$$

$$T_i^{j+1} = \overline{\sigma_i\overline{L_i}\overline{\lambda_{i+1}} + \overline{\Omega_4}\overline{L_i}\overline{\lambda_{i+1}} + \sigma_{i+1}\overline{L_{i+1}}\overline{\lambda_{i+2}} + \overline{\Omega_4}\overline{L_{i+1}}\overline{\lambda_{i+2}}}.$$

37. The apparatus according to claim 27 wherein said a post-adder logical operation when the second instruction of an interlocked pair specifies a logical operation is embedded in the sum equation of the CLA.

38. The apparatus according to claim 37 wherein the sum of the CLA incorporating the post-logical operations is computed by:

$$\Lambda_i = S_i \Xi_{ADD} + (S_i + B_i)\Xi_{OR} + (S_iB_i)\Xi_{AND} + (S_i \forall B_i)\Xi_{XOR}.$$

39. The apparatus according to claim 37 wherein the sum of the CLA incorporating the post-logical operations is computed by:

$$\Lambda_i = \mu_i\phi_{i+1} + \theta_i\overline{\phi_{i+1}} + \Xi_{SOM_i}.$$

where $$\mu_i = M_i \Xi_{GENi} + \overline{M_i} \Xi_{SXMi}$$

and, $$\theta_i = H_i \Xi_{GENi} + \overline{H_i} \Xi_{SXMi}$$

and, $$\Xi_{GENi} = \Xi_{ADD} + \Xi_{OR} + B_i \Xi_{AND} + \overline{B_i} \Xi_{XOR}$$

$$\Xi_{SXMi} = B_i \Xi_{XOR}$$

$$\Xi_{SOMi} = B_i \Xi_{OR}.$$

40. The apparatus according to claim 37 wherein the sum of the CLA incorporating the post-logical operation is computed by:

$$\Lambda_0 = \mu_0^* G_1^{+n} + \mu_0 T_2^{n+1} \phi_{n+1}^2 + \theta_0 \overline{G_1^{*n}} \overline{T_2^{n+1}} \theta_0 \cdot \overline{G_1^{*n} \phi_{n+1}^2};$$

wherein $$\phi = G_1^{*n} + T_2^{n+1} \phi_{n+1}$$

and $$\mu_0^* = \mu_0 + \Xi_{SOMO},$$

and $$G_1^{+n} = G_1^{*n} + \Xi_{SOMO},$$

and $$\mu_0 = M_0 \Xi_{GEN0} + \overline{M_0} \Xi_{SXM0}$$

$$\theta_0 = H_0 \Xi_{GEN0} + \overline{H_0} \Xi_{SXM0}.$$

41. The apparatus according to claim 27 wherein a 3-1 ALU operation can be performed with no additional delay than 3-1 binary addition.

42. The apparatus according to claim 27 wherein The 3-1 ALU operation is performed with 5 stages characterized by:

STAGE 1 (CSA)
$$L_i = L_{li} \Omega_{OALASL} + L_{ri} \Omega_{OALASL} + L_{li} L_{ri} \Omega_{XAAL} + \overline{L_{li}} \overline{L_{ri}} \Omega_{XOSL}$$

-continued
$$\overline{L_i} = L_{li} \Omega_{OALASL} + L_{ri} \Omega_{OALASL} + L_{li} L_{ri} \Omega_{XAAL} + \overline{L_{li} L_{ri}} \Omega_{XOSL}$$
$$\sigma_i = \alpha_i \beta_i \overline{\gamma_i} + \overline{\alpha_i} \beta_i \gamma_i + \overline{\alpha_i} \beta_i \gamma_i + \alpha_i \beta_i \gamma_i \ 0 \leq i \ 31$$
$$\overline{\sigma_i} = \alpha_i \beta_i \overline{\gamma_i} + \overline{\alpha_i} \beta_i \gamma_i + \overline{\alpha_i} \beta_i \gamma_i + \alpha_i \beta_i \gamma_i \ 0 \leq i \ 31$$
$$\lambda_i = \alpha_i \beta_i \Omega_1 + \alpha_i \gamma_i \Omega_2 + \beta_i \gamma_i \Omega_1 + \beta_{i-1} \Omega_3.$$
$$\overline{\lambda_i} = \alpha_i \beta_i \Omega_1 + \alpha_i \gamma_i \Omega_2 + \beta_i \gamma_i \Omega_1 + \beta_{i-1} \Omega_3.$$
$$\overline{\lambda_i} = \alpha_i \beta_i + \alpha_i \gamma_i + \beta_i \gamma_i \ 0 \leq i \leq 31$$
$$\lambda_i = \tau_2 \ i = 32$$
$$\Xi_{GENi} = \Xi_{ADD} + \Xi_{OR} + B_i \Xi_{AND} + \overline{B_i} \Xi_{XOR}$$
$$\Xi_{SXMi} = B_i \Xi_{XOR}$$
$$\Xi_{SOMi} = B_i \Xi_{OR}$$

STAGE 2 (CLA)
$$G_i^{i+1*} = \sigma_i \Omega_4 \lambda_{i+1} + L_i \lambda_{i+1} + \sigma_{i+1} \Omega_4 \lambda_{i+2} + L_{i+1} \lambda_{i+2} \cdot$$
$$i = 1, 3, 5, \ldots 29$$
$$T_i^{i+1} = \overline{\sigma_i} \overline{L_i} \lambda_{i+1} + \overline{\Omega_4} \overline{L_i} \lambda_{i+1} + \overline{\sigma_{i+1}} \overline{L_{i+1}} \lambda_{i+2} + \overline{\Omega_4} \overline{L_{i+1}} \lambda_{i+2} \cdot$$
$$T_1 = \lambda_2 L_1 + \sigma_1 \lambda_2 \Omega_4 \ i = 2, 4, 6, \ldots 30$$
$$H_0 = \overline{\sigma_i} \overline{L_i} \lambda_{i+1} + \overline{\Omega_4} \overline{L_i} \lambda_{i+1} + \sigma_i \Omega_4 \lambda_{i+1} + L_i \overline{\lambda_{i+1}} \cdot$$
$$\overline{H_0} = \overline{\sigma_i} \overline{L_i} \lambda_{i+1} + \overline{\Omega_4} \overline{L_i} \lambda_{i+1} + \sigma_i \Omega_4 \lambda_{i+1} + L_i \overline{\lambda_{i+1}} \cdot$$
$$\phi_{31} = \sigma_{31} \Omega_4 \lambda_{32} + L_{31} \lambda_{32} + \tau_1.$$

STAGE 3 (CLA)
$$G_i^{i+5*} = G_{i}^{i+1*} + T_{i+1}^{i+2} G_{i+2}^{i+3*} + T_{i+1}^{i+2} T_{i+3}^{i+4} G_{i+4}^{i+5*} \ i = 1, 7, 13, 19$$
$$T_i^{i+5} = T_i^{i+1} T_{i+2}^{i+3} T_{i+4}^{i+5} \ i = 2, 8, 14$$
$$M_0 = H_0 \triangledown T_1$$
$$\overline{M_0} = \overline{H_0 \triangledown T_1}$$
$$\theta_0 = H_0 \Xi_{GENO} + \overline{H_0} \Xi_{SXMO}$$
$$\mu_0 = H_0 \overline{T_1} \Xi_{GENO} + \overline{H_0} T_1 \Xi_{GENO} + H_0 T_1 \Xi_{SXMO} + \overline{H_0} \overline{T_1} \Xi_{SXMO}$$
$$\phi_{27}^{31} = G_{27}^{30*} + T_{28}^{29} G_{29}^{30*} + T_{28}^{29} T_{30}^{31} \phi_{31}$$

STAGE 4 (CLA)
$$G_1^{18*} = G_1^{6*} + T_2^7 G_7^{12*} + T_2^7 T_8^{13} G_{13}^{18*}$$
$$\overline{G_1}^{18} = \overline{G_1^{6*} + T_2^7 G_7^{12*} + T_2^7 T_8^{13} G_{13}^{18*}} + \Xi_{SOMO}$$
$$T_2^{19} = T_2^7 T_8^{13} T_{14}^{19}$$
$$\mu_0^* = \mu_0 + \Xi_{SOMO}$$
$$\phi_{19}^{26} = G_{19}^{24*} + T_{20}^{25} G_{25}^{26*} + T_{20}^{25} T_{26}^{27} \phi_{27}^{31}$$

STAGE 5 (CLA)
$$\Lambda_0 = \mu_0^* G_1^{18} + \mu_0 T_2^{19} \phi_{19}^{26} + \theta_0 \overline{G_1^{18*} T_2^{19}} + \theta_0 \overline{G_1^{18*} \phi_{19}^{26}}.$$

43. An arithmetic logic apparatus according to claim 27 wherein said 3-1 addition means executes a pair of interlocked instructions wherein
   an arithmetic logic unit is provided for processing instructions in a dataflow including:
   means for providing there input operands to said arithmetic logic unit and wherein said
   3-1 addition means is provided for receiving said two unique and one common operand as three input operands and for addition of two's complement and unsigned numbers for executing the pair interlocked instructions in parallel in a single pass through said 3-1 addition means and,
   wherein execution of said interlocked instructions is enabled in a single pass for an interlocked instruction sequence of functions: a logical followed by arithmetic, arithmetic followed by logical; and a logical followed by logical.

* * * * *